United States Patent
Han

(10) Patent No.: US 10,492,235 B2
(45) Date of Patent: Nov. 26, 2019

(54) TRANSMISSION RESOURCE REQUESTING METHOD AND APPARATUS

(71) Applicant: Huawei Technologies Co., Ltd., Shenzhen (CN)

(72) Inventor: Guanglin Han, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 178 days.

(21) Appl. No.: 15/637,785

(22) Filed: Jun. 29, 2017

(65) Prior Publication Data
US 2017/0303319 A1 Oct. 19, 2017

Related U.S. Application Data

(63) Continuation of application No. PCT/CN2014/095837, filed on Dec. 31, 2014.

(51) Int. Cl.
*H04W 76/10* (2018.01)
*H04W 72/12* (2009.01)
(Continued)

(52) U.S. Cl.
CPC ............ *H04W 76/10* (2018.02); *H04W 4/70* (2018.02); *H04W 8/005* (2013.01); *H04W 24/10* (2013.01);
(Continued)

(58) Field of Classification Search
CPC ....... H04W 76/10; H04W 76/14; H04W 4/70; H04W 72/04; H04W 72/0406;
(Continued)

(56) References Cited

U.S. PATENT DOCUMENTS

2010/0142457 A1* 6/2010 Chun ................ H04W 72/1284
370/329
2012/0129540 A1 5/2012 Hakola et al.
(Continued)

FOREIGN PATENT DOCUMENTS

CN 103139764 A 6/2013
CN 103428679 A 12/2013
(Continued)

OTHER PUBLICATIONS

"Resource allocation for D2D communication",3GPP TSG-RAN WG2 Meeting #85,Prague, Czech Republic, R2-140693,3rd Generation Partnership Project, Valbonne, France (Feb. 10-14, 2014).
(Continued)

*Primary Examiner* — Paul H Masur
(74) *Attorney, Agent, or Firm* — Leydig, Voit & Mayer, Ltd.

(57) ABSTRACT

The present invention discloses a method which includes: receiving, by first UE, resource configuration information for communication between the first UE and an eNodeB; determining, by the first UE, data needing to be sent to second UE; determining, by the first UE, a D2D transmission resource indication needing to be sent; sending, by the first UE on a resource corresponding to the resource configuration information to the eNodeB, a resource SR carrying the D2D transmission resource indication, where the D2D transmission resource indication is used to request the eNodeB to allocate a D2D transmission resource to the first UE; receiving D2D transmission resource information used for sending the data to the second UE, where the D2D transmission resource information is allocated by the eNodeB according to the D2D transmission resource indication; and sending, by the first UE, the data to the second UE on the D2D transmission resource.

15 Claims, 7 Drawing Sheets

(51) Int. Cl.
*H04W 4/70* (2018.01)
*H04W 8/00* (2009.01)
*H04W 24/10* (2009.01)
*H04W 72/04* (2009.01)
*H04W 76/14* (2018.01)
*H04W 88/08* (2009.01)

(52) U.S. Cl.
CPC ... *H04W 72/0406* (2013.01); *H04W 72/1278* (2013.01); *H04W 72/04* (2013.01); *H04W 72/1284* (2013.01); *H04W 76/14* (2018.02); *H04W 88/08* (2013.01)

(58) Field of Classification Search
CPC ......... H04W 72/1278; H04W 72/1284; H04W 8/005; H04L 5/0037
See application file for complete search history.

(56) References Cited

U.S. PATENT DOCUMENTS

| | | |
|---|---|---|
| 2013/0100908 A1 | 4/2013 | Xu et al. |
| 2014/0010179 A1 | 1/2014 | Lee |
| 2014/0023008 A1 | 1/2014 | Ahn et al. |
| 2014/0314009 A1 | 10/2014 | Xiong |
| 2015/0146633 A1* | 5/2015 | Kalhan ............... H04L 1/1607 370/329 |
| 2015/0208383 A1 | 7/2015 | Fujishiro |
| 2016/0044737 A1* | 2/2016 | Kwon ................. H04W 76/14 370/328 |
| 2016/0302173 A1* | 10/2016 | Feng .................. H04W 72/042 |
| 2017/0245295 A1* | 8/2017 | Jung ..................... H04W 28/02 |
| 2017/0295248 A1* | 10/2017 | Fujishiro .............. H04W 56/00 |

FOREIGN PATENT DOCUMENTS

| | | |
|---|---|---|
| CN | 103841649 A | 6/2014 |
| CN | 104244443 A | 12/2014 |
| JP | 2013530648 A | 7/2013 |
| WO | 2013177447 A1 | 11/2013 |
| WO | 2014017504 A1 | 1/2014 |
| WO | 2014076552 A2 | 5/2014 |
| WO | 2014187174 A1 | 11/2014 |

OTHER PUBLICATIONS

R1-141164 Intel Corporation,"Discussion on D2D Operation within Network Coverage (Mode-1)," 3GPP TSG RAN WG1 Meeting # 76bis, Shenzhen, China, Mar. 31-Apr. 4, 2014, total 7 pages.
R2-144382 Panasonic,"ProSe BSR procedure for D2D communication",3GPP TSG RAN WG2 Meeting #87bis, Shanghai, China, Oct. 6-10, 2014, total 3 pages.
R1-141307 Samsung, "Mode 1 resource allocation for D2D broadcast communication," 3GPP TSG RAN WG1 Meeting #76bis, Shenzen, China, Mar. 31-Apr. 4, 2014, total 5 pages.
R2-141133 Samsung, "Resource allocation for Mode-1," 3GPP TSG-RAN WG2 #85bis, Valencia, Spain, Mar. 31-Apr. 4, 2014, total 3 pages.
R1-142112 Samsung, "Mode 1 resource allocation for D2D broadcast communication," 3GPP TSG RAN WG1 Meeting #77, Seoul, Republic of Korea, May 19-23, 2014.
"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321, V12.3.0, pp. 1-58, 3rd Generation Partnership Project, Valbonne, France (Sep. 2014).
"ProSe-BSR Triggering and Cancelling Mechanisms and Text Proposals," 3GPP TSG RAN WG2 Meeting #87bis, Shanghai, China, R2-144407, 3rd Generation Partnership Project, Valbonne, France (Oct. 6-10, 2014).

* cited by examiner

TRANSMISSION RESOURCE REQUESTING METHOD AND APPARATUS

CROSS-REFERENCE TO RELATED APPLICATIONS

This application is a continuation of International Application No. PCT/CN2014/095837, filed on Dec. 31, 2014, the disclosure of which is hereby incorporated by reference in its entirety.

TECHNICAL FIELD

Embodiments of the present invention relate to the communications systems, and in particular, to a transmission resource requesting method and apparatus.

BACKGROUND

In a Long Term Evolution (LTE) system, an evolved NodeB (eNodeB) is responsible for scheduling downlink data and uplink data of a user equipment (UE), and transmitting the downlink data and the uplink data over an air interface. However, for the uplink data of the user equipment, because the user equipment first generates the uplink data, the eNodeB needs to obtain uplink data information (for example, a size of a data volume) of the user equipment, so that the eNodeB can allocate, to the user equipment, a transmission resource suitable for sending the uplink data, so as to perform scheduling in time and accurately.

Specifically, as shown in FIG. 1, a procedure in which UE 1 requests a transmission resource for uplink data is as follows:

101: When UE 1 generates uplink data needing to be sent to UE 2, and UE 1 has no transmission resource for sending the uplink data, UE 1 sends a scheduling request (SR) to an eNodeB, to instruct the eNodeB to allocate, to UE 1, a transmission resource (1.5 ms) for sending the uplink data.

102: The eNodeB allocates an uplink grant (UL Grant) resource to UE 1, and sends the UL Grant to UE 1. The UL Grant is used by UE 1 to report data volume information of the uplink data buffered by UE 1 to the eNodeB (4 ms).

103: After UE 1 receives the UL grant allocated by the eNodeB, UE 1 sends a buffer status report (BSR) (4 ms) to the eNodeB on a transmission resource corresponding to the UL grant.

104: The eNodeB allocates, to UE 1 according to the received BSR, a transmission resource for sending the uplink data and a scheduling control resource, where the scheduling control resource is used to send a scheduling assignment (SA) when UE 1 sends the uplink data by using the allocated uplink data transmission resource; the eNodeB sends resource scheduling information to notify UE 1 of transmission resource information and scheduling control resource information (4 ms).

105: UE 1 sends the uplink data to UE 2 on the transmission resource, and sends an scheduling assignment to UE 2 on the scheduling control resource, where the scheduling assignment is used to notify UE 2 of information about a transmission format for sending the uplink data and transmission resource location information (4 ms) of the data.

Because UE 1 frequently communicates with UE 2, if the scheduling manner shown in FIG. 1 is still used, and UE 1 frequently communicates with the eNodeB, and excessively high overheads of transmission resources between the eNodeB and the user equipment are caused. Moreover, 17.5 ms is required for UE 1 to request an uplink data transmission resource by UE 1 from the eNodeB, the transmission delay is excessively long and cannot meet a low delay requirement (10 ms) of communication between UE 1 and UE 2.

SUMMARY

An objective of the present invention is to provide a transmission resource requesting method and apparatus. According to the method and the apparatus, scheduling overheads can be decreased and a scheduling delay can be reduced.

According to a first aspect, a resource requesting apparatus is provided, including:

a receiving module, configured to receive resource configuration information for communication with an evolved NodeB (eNodeB); a processing module, configured to determine data needing to be sent to a user equipment (UE); where the processing module is configured to determine a device-to-device (D2D) transmission resource indication needing to be sent; and a sending module, configured to send, on a resource corresponding to the resource configuration information received by the receiving module to the eNodeB, a resource scheduling request (SR) carrying the D2D transmission resource indication determined by the processing module, where the D2D transmission resource indication is used to request the eNodeB to allocate a D2D transmission resource; where the receiving module is configured to receive D2D transmission resource information, where the D2D transmission resource is used for sending the data to the user equipment, and the D2D transmission resource information is allocated by the eNodeB according to the D2D transmission resource indication determined by the processing module; and the sending module is configured to send the data determined by the processing module to the user equipment on the D2D transmission resource corresponding to the D2D transmission resource information received by the receiving module.

With reference to the first aspect, in a first possible implementation manner of the first aspect, the receiving module is specifically configured to receive configuration information of a device-to-device physical scheduling request channel (D2D PSRCH) resource, where the D2D PSRCH resource is used for communication with the eNodeB.

With reference to the first aspect, or the first possible implementation manner of the first aspect, in a second possible implementation solution of the first aspect, the processing module is specifically configured to determine, according to a correspondence between resource information required for sending the data and a D2D transmission resource indication, the D2D transmission resource indication needing to be sent.

With reference to the first aspect or the second possible implementation manner of the first aspect, in a third possible implementation manner of the first aspect, the D2D transmission resource indication needing to be sent is determined according to a correspondence between a size of a D2D data volume needing to be sent and a D2D transmission resource indication; or the D2D transmission resource indication to be sent is determined according to a correspondence between a message type of D2D transmission data needing to be sent and a D2D transmission resource indication; or the D2D transmission resource indication to be sent is determined according to a correspondence between a service type of D2D data needing to be sent and a D2D transmission resource indication; or the D2D transmission resource indication to be sent is determined according to a correspondence between a logical channel of D2D data needing to be sent and a D2D transmission resource indication; or the D2D transmission resource indication to be sent is determined according to a correspondence between a logical channel group of D2D data needing to be sent and a D2D transmission resource indication.

With reference to the first aspect or the third possible implementation manner of the first aspect, in a fourth possible implementation manner of the first aspect, the processing module is further configured to obtain a preconfigured correspondence between the resource information required for sending the data and a D2D transmission resource indication.

According to a second aspect, a resource requesting apparatus is provided, including: a processing module, configured to allocate resource configuration information for communication with a first user equipment; a sending module, configured to send, to the first user equipment, the resource configuration information allocated by the processing module; and a receiving module, configured to receive a resource scheduling request SR that is sent by the first user equipment on a resource corresponding to the resource configuration information, where the scheduling request carries a D2D transmission resource indication; where the processing module is configured to allocate a D2D transmission resource to the first user equipment according to the D2D transmission resource indication received by the receiving module, where the D2D transmission resource is used by the first user equipment to send data to a second user equipment; and the sending module is configured to send, to the first user equipment, D2D transmission resource information allocated by the processing module.

With reference to the second aspect, in a first possible implementation manner of the second aspect, the sending module is specifically configured to send configuration information of a device-to-device physical scheduling request channel (D2D PSRCH) resource to the first user equipment, where the D2D PSRCH resource is used for communication with the first user equipment.

With reference to the second aspect or the first possible implementation manner of the second aspect, in a second possible implementation manner of the second aspect, the processing module is specifically configured to allocate the D2D transmission resource to the first user equipment according to a correspondence between the D2D transmission resource indication and resource information that is required for the first user equipment to send the data.

With reference to the second aspect or the second possible implementation manner of the second aspect, in a third possible implementation manner of the second aspect, the processing module is specifically configured to: allocate a D2D transmission resource to the first user equipment according to a correspondence between the D2D transmission resource indication and a size of a D2D data volume needing to be sent by the first user equipment; or allocate a D2D transmission resource to the first user equipment according to a correspondence between the D2D transmission resource indication and a message type of D2D transmission data needing to be sent by the first user equipment; or allocate a D2D transmission resource to the first user equipment according to a correspondence between the D2D transmission resource indication and a priority of a D2D data message needing to be sent by the first user equipment; or allocate a D2D transmission resource to the first user equipment according to a correspondence between the D2D transmission resource indication and a service type of D2D data needing to be sent by the first user equipment; or allocate a D2D transmission resource to the first user equipment according to a correspondence between the D2D transmission resource indication and a logical channel of D2D data needing to be sent by the first user equipment; or allocate a D2D transmission resource to the first user equipment according to a correspondence between the D2D transmission resource indication and a logical channel group of D2D data needing to be sent by the first user equipment.

With reference to the second aspect or any one of the first to the third possible implementation manners of the second aspect, in a fifth possible implementation manner of the second aspect, the processing module is further configured to preconfigure a correspondence between data information and D2D transmission resource indication information for the first user equipment.

According to a third aspect, a resource requesting system is provided, including the resource requesting apparatus according to any one of the first aspect or the first to the fourth possible implementation manners of the first aspect, the resource requesting apparatus according to any one of the second aspect or the first to the fourth possible implementation manners of the second aspect, and a second user equipment communicating with the first user equipment.

According to a fourth aspect, a resource requesting apparatus is provided, including: a processing module, configured to obtain a first data transmission resource and a second data transmission resource that are allocated by an evolved NodeB (eNodeB), where the first transmission resource is used for communication with another user equipment, and the second transmission resource is used for communication with the eNodeB; where the processing module is configured to determine to construct, when the first data transmission resource is capable of accommodating all device-to-device (D2D) data, a Media Access Control protocol data unit (MAC PDU) that does not include a D2D buffer status report BSR; and a sending module, configured to send, on the second data transmission resource obtained by the processing module, the MAC PDU constructed by the processing module.

With reference to the fourth aspect, in a first possible implementation manner of the fourth aspect, the D2D BSR is a non-padding BSR.

With reference to the first possible implementation manner of the fourth aspect, in a second possible implementation manner of the fourth aspect, the processing module is further configured to determine that the second data transmission resource is capable of accommodating all data sent to the eNodeB, and that an idle resource still exists after the sending module sends all the data and a Media Access Control channel element (MAC CE); and the sending module is specifically configured to send a padding D2D BSR by using the idle resource determined by the processing module.

According to a fifth aspect, a resource requesting apparatus is provided, including: a processing module, configured to determine that a device-to-device (D2D) buffer status report BSR is already triggered; where the processing module is configured to obtain a first data transmission resource allocated by an evolved NodeB (eNodeB), where the first data resource is used for communication between a user equipment (UE) and the eNodeB; and the processing module is configured to: when the obtained first data transmission resource is capable of accommodating first data, the first data is all data that needs to be sent by the user equipment to the eNodeB, and it is determined that the first data transmission resource is incapable of accommodating both the first data and the D2D BSR, cancel, by the user equipment, a sending state of the D2D BSR; or is configured to: when the obtained first data transmission resource is capable of accommodating the first data and is incapable of accommodating the first data and the D2D BSR, determine to send the first data first; or is configured to: when the obtained first data transmission resource is capable of accommodating the first data and the D2D BSR and the first data transmission resource is incapable of accommodating the first data, the D2D BSR, and a Media Access Control channel element (MAC CE), determine to send the first data and the D2D BSR first; and a sending module, configured to: when the processing module determines to send the first data first, send the first data to the eNodeB; or is configured to: when the processing module determines to send the first data and the D2D BSR first, send the first data and the D2D BSR to the eNodeB.

With reference to the fifth aspect, in a first possible implementation manner of the fifth aspect, the MAC CE includes a BSR or a power headroom report needing to be sent to the eNodeB.

With reference to the fifth aspect or the first possible implementation manner of the fifth aspect, in a second possible implementation manner of the fifth aspect, the D2D BSR is a non-padding BSR.

With reference to the second possible implementation manner of the fifth aspect, in a third possible implementation manner of the fifth aspect, the processing module is further configured to determine that the first data transmission resource is capable of accommodating the first data, and that an idle resource still exists after the first data and the MAC CE are sent; and the sending module is further configured to send a padding D2D BSR on the idle resource determined by the processing module.

According to a sixth aspect, a resource requesting method is provided, including: receiving, by a first user equipment UE, resource configuration information for communication between the first user equipment and an evolved NodeB (eNodeB); determining, by the first user equipment, data needing to be sent to a second user equipment; determining, by the first user equipment, a D2D transmission resource indication needing to be sent; sending, by the first user equipment on a resource corresponding to the resource configuration information to the eNodeB, a resource scheduling request (SR) carrying the D2D transmission resource indication, where the D2D transmission resource indication is used to request the eNodeB to allocate a D2D transmission resource to the first user equipment; receiving, by the first user equipment, D2D transmission resource information used for sending the data to the second user equipment, where the D2D transmission resource information is allocated by the eNodeB according to the D2D transmission resource indication; and sending, by the first user equipment, the data to the second user equipment on the D2D transmission resource.

With reference to the sixth aspect, in a first possible implementation manner of the sixth aspect, the receiving, by the first user equipment, resource configuration information includes:

receiving, by the first user equipment, configuration information of a device-to-device physical scheduling request channel (D2D PSRCH) resource, where the D2D PSRCH resource is used for communication between the first user equipment and the eNodeB.

With reference to the sixth aspect or the first possible implementation manner of the sixth aspect, in a second possible implementation manner of the sixth aspect, the determining, by the first user equipment, a D2D transmission resource indication needing to be sent includes:

determining, by the first user equipment according to a correspondence between resource information required for sending the data and a D2D transmission resource indication, the D2D transmission resource indication needing to be sent.

With reference to the second possible implementation manner of the sixth aspect, in a third possible implementation manner of the sixth aspect, the determining, by the first user equipment according to a correspondence between information for the data and a D2D transmission resource indication, the D2D transmission resource indication needing to be sent includes: determining, by the first user equipment according to a correspondence between a size of a D2D data volume needing to be sent and a D2D transmission resource indication, the D2D transmission resource indication needing to be sent; or determining, by the first user equipment according to a correspondence between a message type of D2D transmission data needing to be sent and a D2D transmission resource indication, the D2D transmission resource indication to be sent; or determining, by the first user equipment according to a correspondence between a priority of a D2D data message needing to be sent and a D2D transmission resource indication, the D2D transmission resource indication to be sent; or determining, by the first user equipment according to a correspondence between a service type of D2D data needing to be sent and a D2D transmission resource indication, the D2D transmission resource indication to be sent; or determining, by the first user equipment according to a correspondence between a logical channel of D2D data needing to be sent and a D2D transmission resource indication, the D2D transmission resource indication to be sent; or determining, by the first user equipment according to a correspondence between a logical channel group of D2D data needing to be sent and a D2D transmission resource indication, the D2D transmission resource indication to be sent.

With reference to any one of the sixth aspect or the first to the third possible implementation manners of the sixth aspect, in a fourth possible implementation manner of the sixth aspect, before the determining, by the first user equipment according to information for the data, content of a D2D scheduling request needing to be sent, the method further includes: obtaining, by the first user equipment, a preconfigured correspondence between data information and a D2D transmission resource indication.

According to a seventh aspect, a resource requesting method is provided, including: obtaining, by a user equipment UE, a first data transmission resource and a second data transmission resource that are allocated by an evolved NodeB (eNodeB), where the first transmission resource is used for communication between the user equipment and another user equipment, and the second transmission resource is used for communication between the user equipment and the eNodeB; if the first data transmission resource is capable of accommodating all device-to-device (D2D) data, constructing, by the user equipment, a Media Access Control protocol data unit (MAC PDU) that does not include a D2D buffer status report (BSR); and sending, by the user equipment, the MAC PDU on the second data transmission resource.

With reference to the seventh aspect, in a first possible implementation manner of the seventh aspect, the D2D BSR is a non-padding BSR.

In the second possible implementation manner of the seventh aspect, the method further includes: if the second data transmission resource is capable of accommodating all data that is sent by the user equipment to the eNodeB, and an idle resource still exists after the user equipment sends all the D2D data and a MAC CE to the eNodeB, sending, by the user equipment, a padding D2D BSR by using the idle resource.

According to an eighth aspect, a resource requesting method is provided, including: determining, by a user equipment (UE), that a device-to-device (D2D) buffer status report (BSR) is already triggered; obtaining, by the user equipment, a first data transmission resource allocated by an evolved NodeB (eNodeB), where the first data transmission resource is used for communication between the user equipment and the eNodeB; and if the first data transmission resource is capable of accommodating first data, the first data is all data that needs to be sent by the user equipment to the eNodeB, and it is determined that the first data transmission resource is incapable of accommodating both the first data and the D2D BSR, canceling, by the user equipment, a sending state of the D2D BSR; or if the first data transmission resource is capable of accommodating the first data and is incapable of accommodating the first data and the D2D BSR, sending, by the user equipment, the first data first; or if the first data transmission resource is capable of accommodating the first data and the D2D BSR and the first data transmission resource is incapable of accommodating the first data, the D2D BSR, and a Media Access Control channel element (MAC CE), sending, by the user equipment, the first data and the D2D BSR first.

With reference to the eighth aspect, in a first possible implementation manner of the eighth aspect, the MAC CE includes a BSR or a power headroom report needing to be sent by the user equipment to the eNodeB.

With reference to the eighth aspect or the first possible implementation manner of the eighth aspect, in a second possible implementation manner of the eighth aspect, the D2D BSR is a non-padding BSR.

With reference to the first possible implementation manner of the eighth aspect, in a second possible implementation manner of the eighth aspect, the method further includes: if the first data transmission resource is capable of accommodating the first data, and an idle resource still exists after the user equipment sends the first data and the MAC CE, sending, by the user equipment, a padding D2D BSR by using the idle resource.

According to a ninth aspect, a resource requesting method is provided, including: allocating, by an evolved NodeB (eNodeB), resource configuration information for communication between a first user equipment (UE) and the eNodeB; sending, by the eNodeB, the resource configuration information to the first user equipment; receiving, by the eNodeB, a resource scheduling request SR that is sent by the first user equipment on a resource corresponding to the resource configuration information, where the scheduling request carries a device-to-device (D2D) transmission resource indication; allocating, by the eNodeB, a D2D transmission resource to the first user equipment according to the D2D transmission resource indication, where the D2D transmission resource is used by the first user equipment to send data to a second user equipment; and sending, by the eNodeB, D2D transmission resource information to the first user equipment.

With reference to the ninth aspect, in a first possible implementation manner of the ninth aspect, the sending, by the eNodeB, the resource configuration information to the first user equipment includes: sending, by the eNodeB, configuration information of a device-to-device physical scheduling request channel (D2D PSRCH) resource to the first user equipment, where the D2D PSRCH resource is used for communication between the first user equipment and the eNodeB.

With reference to the ninth aspect or the first possible implementation manner of the ninth aspect, in a second possible implementation manner of the ninth aspect, the allocating, by the eNodeB, a D2D transmission resource to the first user equipment according to the D2D transmission resource indication includes: allocating, by the eNodeB, the D2D transmission resource information to the first user equipment according to a correspondence between the D2D transmission resource indication and resource information that is required for the first user equipment to send the data.

With reference to the second possible implementation manner of the ninth aspect, in a third possible implementation manner of the ninth aspect, the correspondence between the D2D transmission resource indication and the resource information that is required for the first user equipment to send the data includes: a correspondence between the D2D transmission resource indication and a size of a D2D data volume needing to be sent by the first user equipment; or a correspondence between the D2D transmission resource indication and a message type of D2D transmission data needing to be sent by the first user equipment; or a correspondence between the D2D transmission resource indication and a priority of a D2D data message needing to be sent by the first user equipment; or a correspondence between the D2D transmission resource indication and a service type of D2D data needing to be sent by the first user equipment; or a correspondence between the D2D transmission resource indication and a logical channel of D2D data needing to be sent by the first user equipment; or a correspondence between the D2D transmission resource indication and a logical channel group of D2D data needing to be sent by the first user equipment.

With reference to any one of the ninth aspect or the first to the third possible implementation manners of the ninth aspect, in a fourth possible implementation manner of the ninth aspect, the method further includes: preconfiguring, by the eNodeB, a correspondence between data information and a D2D transmission resource indication for the first user equipment.

Based on the foregoing technical solutions, the embodiments of the present invention provide a transmission resource requesting method. A first user equipment determines a device-to-device (D2D) transmission resource indication needing to be sent, and sends the D2D transmission resource indication to an eNodeB, where the D2D transmission resource indication is used to request the eNodeB to allocate a D2D transmission resource to the first user equipment, so that the eNodeB allocates a transmission resource to the user equipment according to the received D2D transmission resource indication. This omits a process in the prior art in which an eNodeB needs to send an uplink grant to a first user equipment before the first user equipment sends a BSR to the eNodeB, thereby reducing overloads of transmission resources between the eNodeB and the user equipment, and avoids a problem of an excessively long delay in requesting a transmission resource by the first user equipment from the eNodeB, thereby reducing a scheduling delay.

Based on the foregoing technical solutions, the embodiments of the present invention provide a transmission resource requesting method. If a first data transmission resource is capable of accommodating all device-to-device (D2D) data, a user equipment constructs a Media Access Control protocol data unit (MAC PDU) that does not include a D2D buffer status report BSR, so that the user equipment directly sends the MAC PDU to an eNodeB, and does not need to send the D2D BSR to the eNodeB. This omits a process in the prior art in which an eNodeB needs to send an uplink grant to a user equipment before the user equipment sends a BSR to the eNodeB, thereby reducing overloads of transmission resources between the eNodeB and the user equipment, and avoids a problem of an excessively long delay in requesting an uplink data transmission resource by the user equipment from the eNodeB, thereby reducing a scheduling delay.

Based on the foregoing technical solutions, the embodiments of the present invention provide a transmission resource requesting method. A user equipment determines that a device-to-device (D2D) buffer status report (BSR) is already triggered, the user equipment obtains a D2eNodeB data transmission resource allocated by an evolved NodeB (eNodeB), and the user equipment determines a manner of processing the BSR according to whether data information can be accommodated by the D2eNodeB data transmission resource. This reduces overloads of transmission resources between the eNodeB and the user equipment, and avoids a problem of an excessively long delay in requesting a transmission resource by the user equipment from the eNodeB, thereby reducing a scheduling delay.

BRIEF DESCRIPTION OF DRAWINGS

To describe technical solutions in embodiments of the present invention more clearly, the following briefly describes the accompanying drawings for describing embodiments of the present invention. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes technical solutions in embodiments of the present invention with reference to the accompanying drawings. The described embodiments are a part rather than all of the embodiments of the present invention. All other embodiments obtained by a person of ordinary skill in the art without creative efforts shall fall within the protection scope of the present invention.

Figure 1:
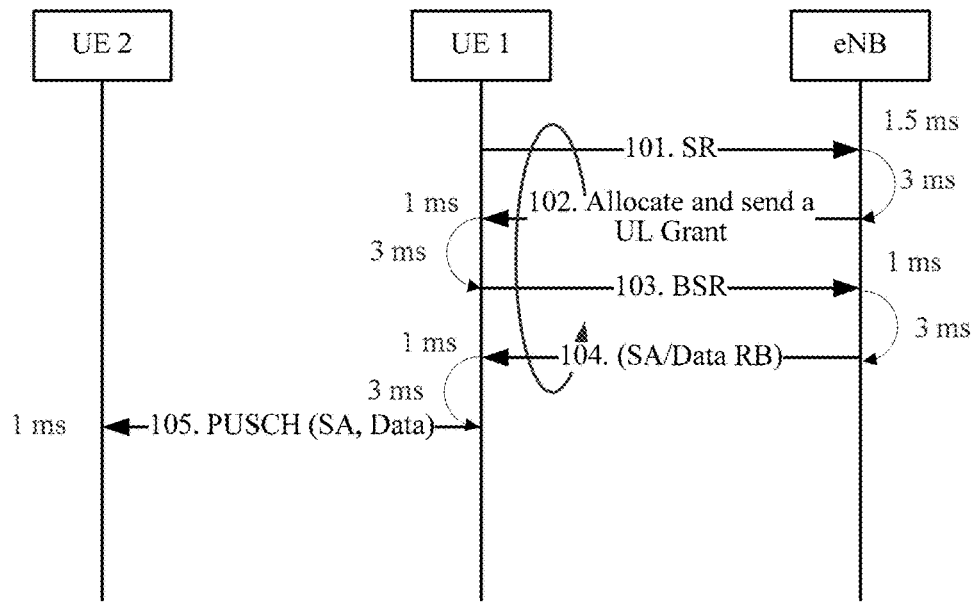
FIG. 1 is a schematic flowchart of requesting an uplink data transmission resource by UE 1 in the prior art.

It should be understood that, in a method for requesting an uplink data transmission resource shown in FIG. 1, a scheduling request SR is sent by using a physical uplink control channel (PUCCH), uses a format of format 1, indicates only that a user equipment needs to transmit data, and does not carry any other auxiliary information.

It should be further understood that, when a BSR is reported, to reduce overheads of transmission resources occupied by the BSR itself, the BSR may be reported in a unit of a logical channel (LCH) or logical channel group (LCG). One LCG may include at least two logical channels (LCH), that is, a data volume reported by the user equipment is a total volume of data to be sent on at least two logical channels (LCH). After receiving the BSR, the eNodeB does not know an accurate data volume of each LCH. In addition, different LCHs usually have different priorities, and the eNodeB cannot accurately determine information about data volumes of different priorities by using only the BSR. Therefore, during scheduling, the eNodeB cannot obtain an accurate reference, and scheduling performance is affected.

Figure 2:
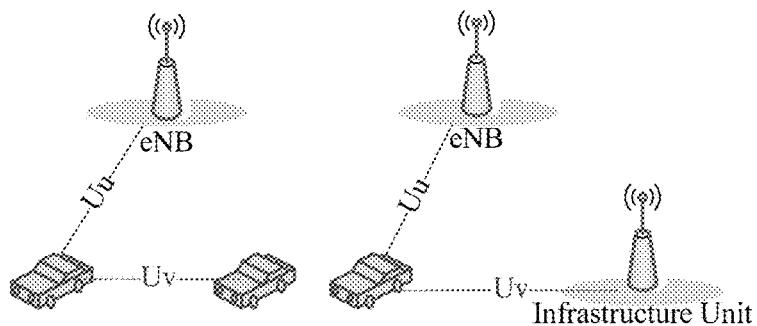
FIG. 2 is a schematic diagram of a network structure of an application scenario according to an embodiment of the present invention.

FIG. 2 is a schematic diagram of a network structure of an application scenario according to an embodiment of the present invention. As shown in FIG. 2, a communications system includes two user equipments and one eNodeB at least. The user equipment communicates with the eNodeB by using a Uu interface, and the user equipments communicate with each other by using a Uv interface.

Specifically, in a vehicle communication scenario, a vehicle communicates messages frequently. As shown in FIG. 1, a vehicle communication message is sent every 100 meters to 300 meters. If there are relatively many vehicles, for example, 200 vehicles, in every 1 ms, there are approximately two vehicles needing to send security messages. If the foregoing scheduling manner is used, overheads of the Uu interface are relatively high. In addition, message communication of some vehicles requires a transmission delay of less than 10 ms, but the delay of the foregoing resource request is approximately 17.5 ms and does not meet a communication requirement of vehicle that requires a low delay.

It should be understood that, a base station mentioned in the present invention may be a base station in a Long Term Evolution (LTE) system, that is, an eNodeB, or may be a base station in a Universal Mobile Telecommunications System (UMTS, or may be a base station in another system. Descriptions are provided by using an eNodeB as an example in the embodiments of the present invention. However, the eNodeB is merely an example given in the present invention. The present invention encompasses the eNodeB but is not limited thereto.

It should be further understood that, the user equipment in the present invention may be a mobile phone, an intelligent terminal, a multimedia device, a streaming device, a vehicle, or the like. For convenience of description, such devices are collectively referred to as a user equipment in the embodiments of the present invention. However, the present invention encompasses such devices but is not limited thereto.

Figure 3:
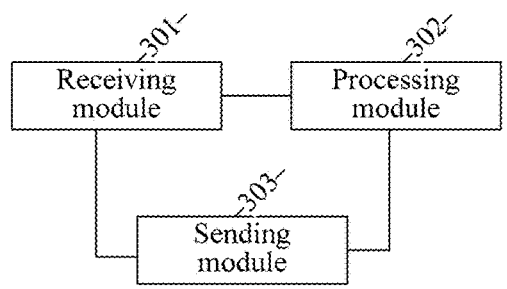
FIG. 3 is a schematic structural diagram of a transmission resource apparatus according to an embodiment of the present invention.

FIG. 3 is a schematic structural diagram of a transmission resource apparatus according to an embodiment of the present invention. The apparatus may be configured to perform embodiments of methods shown in FIG. 8 and FIG. 12. The apparatus includes:

The receiving module 301 is configured to receive resource configuration information for communication with an evolved NodeB eNodeB.

The processing module 302 is configured to determine data needing to be sent to a user equipment UE.

The processing module 302 is configured to determine a device-to-device (D2D) transmission resource indication needing to be sent.

The sending module 303 is configured to send, on a resource corresponding to the resource configuration information received by the receiving module 301 to the eNodeB, a resource scheduling request SR carrying the D2D transmission resource indication determined by the processing module 302. The D2D transmission resource indication is used to request the eNodeB to allocate a D2D transmission resource.

The receiving module 301 is configured to receive D2D transmission resource information. The D2D transmission resource is used for sending the data to the user equipment, and the D2D transmission resource information is allocated by the eNodeB according to the D2D transmission resource indication determined by the processing module 302.

The sending module 303 is configured to send the data determined by the processing module 302 to the user equipment on the D2D transmission resource corresponding to the D2D transmission resource information received by the receiving module 301.

Specifically, the receiving module 301 is specifically configured to receive configuration information of a device-to-device physical scheduling request channel D2D PSRCH resource. The D2D PSRCH resource is used for communication with the eNodeB.

The processing module 302 is specifically configured to determine, according to a correspondence between resource information required for sending the data and a D2D transmission resource indication, the D2D transmission resource indication needing to be sent.

The processing module 302 is specifically configured to:
determine, according to a correspondence between a size of a D2D data volume needing to be sent and a D2D transmission resource indication, the D2D transmission resource indication needing to be sent; or
determine, according to a correspondence between a message type of D2D transmission data needing to be sent and a D2D transmission resource indication, the D2D transmission resource indication to be sent; or determine, according to a correspondence between a service type of D2D data needing to be sent and a D2D transmission resource indication, the D2D transmission resource indication to be sent; or
determine, according to a correspondence between a logical channel of D2D data needing to be sent and a D2D transmission resource indication, the D2D transmission resource indication to be sent; or
determine, according to a correspondence between a logical channel group of D2D data needing to be sent and a D2D transmission resource indication, the D2D transmission resource indication to be sent.

Further, the processing module may be further configured to obtain a preconfigured correspondence between the resource information required for sending the data and a D2D transmission resource indication.

It should be particularly noted that in this embodiment of the present invention, the receiving module may be a receiver, the processing module may be a processor, and the sending module may be a transmitter.

Based on the foregoing technical solution, this embodiment of the present invention provides a transmission resource requesting method. A first user equipment determines a device-to-device (D2D) transmission resource indication needing to be sent, and sends the D2D transmission resource indication to an eNodeB, where the D2D transmission resource indication is used to request the eNodeB to allocate a D2D transmission resource to the first user equipment, so that the eNodeB allocates a transmission resource to the user equipment according to the received D2D transmission resource indication. This omits a process in the prior art in which an eNodeB needs to send an uplink grant to a first user equipment before the first user equipment sends a BSR to the eNodeB, thereby reducing overloads of transmission resources between the eNodeB and the user equipment, and avoids a problem of an excessively long delay in requesting a transmission resource by the first user equipment from the eNodeB, thereby reducing a scheduling delay.

Figure 4:
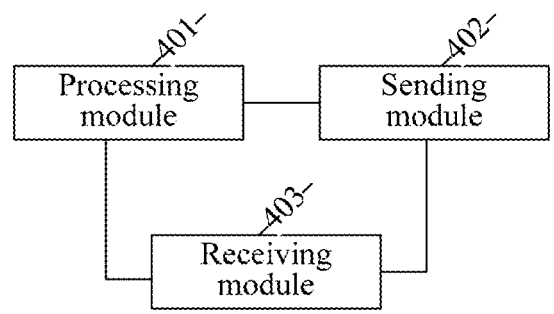
FIG. 4 is a schematic structural diagram of another transmission resource apparatus according to an embodiment of the present invention.

FIG. 4 is a schematic structural diagram of another transmission resource apparatus according to an embodiment of the present invention. It should be particularly noted that the apparatus embodiment shown in FIG. 4 may be used to perform the method embodiments shown in FIG. 11 and FIG. 12. The apparatus includes:

a processing module 401, configured to allocate resource configuration information for communication with a first user equipment;

a sending module 402, configured to send, to the first user equipment, the resource configuration information allocated by the processing module 401; and a receiving module 403, configured to receive a resource scheduling request SR that is sent by the first user equipment on a resource corresponding to the resource configuration information, where the scheduling request carries a D2D transmission resource indication; where the processing module 401 is configured to allocate a D2D transmission resource to the first user equipment according to the D2D transmission resource indication received by the receiving module 403, where the D2D transmission resource is used by the first user equipment to send data to a second user equipment; and the sending module 402 is configured to send, to the first user equipment, D2D transmission resource information allocated by the processing module 401.

The sending module 402 is specifically configured to send configuration information of a device-to-device physical scheduling request channel D2D PSRCH resource to the first user equipment. The D2D PSRCH resource is used for communication with the first user equipment.

The processing module 401 is specifically configured to allocate the D2D transmission resource to the first user equipment according to a correspondence between the D2D transmission resource indication and resource information that is required for the first user equipment to send the data.

The processing module 401 is specifically configured to: allocate a D2D transmission resource to the first user equipment according to a correspondence between the D2D transmission resource indication and a size of a D2D data volume needing to be sent by the first user equipment; or allocate a D2D transmission resource to the first user equipment according to a correspondence between the D2D transmission resource indication and a message type of D2D transmission data needing to be sent by the first user equipment; or allocate a D2D transmission resource to the first user equipment according to a correspondence between the D2D transmission resource indication and a priority of a D2D data message needing to be sent by the first user equipment; or allocate a D2D transmission resource to the first user equipment according to a correspondence between the D2D transmission resource indication and a service type of D2D data needing to be sent by the first user equipment; or allocate a D2D transmission resource to the first user equipment according to a correspondence between the D2D transmission resource indication and a logical channel of D2D data needing to be sent by the first user equipment; or allocate a D2D transmission resource to the first user equipment according to a correspondence between the D2D transmission resource indication and a logical channel group of D2D data needing to be sent by the first user equipment.

Further, the processing module 401 may be further configured to preconfigure a correspondence between data information and D2D transmission resource indication information for the first user equipment.

Based on the foregoing technical solution, this embodiment of the present invention provides a transmission resource requesting method. A first user equipment determines a device-to-device (D2D) transmission resource indication needing to be sent, and sends the D2D transmission resource indication to an eNodeB, where the D2D transmission resource indication is used to request the eNodeB to allocate a D2D transmission resource to the first user equipment, so that the eNodeB allocates a transmission resource to the user equipment according to the received D2D transmission resource indication. This omits a process in the prior art in which an eNodeB needs to send an uplink grant to a first user equipment before the first user equipment sends a BSR to the eNodeB, thereby reducing overloads of transmission resources between the eNodeB and the user equipment, and avoids a problem of an excessively long delay in requesting a transmission resource by the first user equipment from the eNodeB, thereby reducing a scheduling delay.

Figure 5:
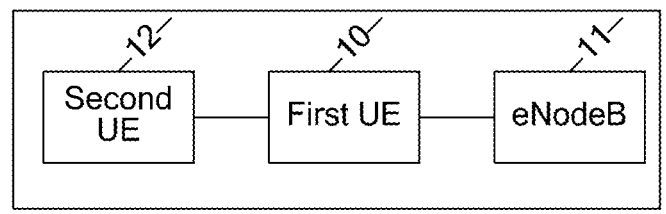
FIG. 5 is a schematic structural diagram of a transmission resource system according to an embodiment of the present invention.

FIG. 5 is a schematic structural diagram of a transmission resource system according to an embodiment of the present invention. The system includes:

a first UE 10, an evolved NodeB eNodeB 11 communicating with the first user equipment, and second UE 12 communicating with the first user equipment.

Figure 6:
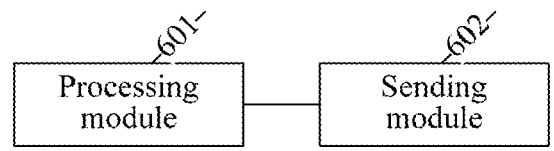
FIG. 6 is a schematic structural diagram of another transmission resource system according to an embodiment of the present invention.

FIG. 6 is a schematic structural diagram of a transmission resource system according to an embodiment of the present invention. It should be particularly noted that the apparatus described in FIG. 6 may be used to perform the method embodiments shown in FIG. 9 and FIG. 13. The apparatus includes:

a processing module 601, configured to obtain a first data transmission resource and a second data transmission resource that are allocated by an evolved NodeB eNodeB, where the first transmission resource is used for communication with another user equipment, and the second transmission resource is used for communication with the eNodeB; where the processing module 601 is configured to determine to construct, when the first data transmission resource is capable of accommodating all device-to-device (D2D) data, a Media Access Control protocol data unit MAC PDU that does not include a D2D buffer status report BSR; and a sending module 602, configured to send, on the second data transmission resource obtained by the processing module 601, the MAC PDU constructed by the processing module.

Specifically, the D2D BSR is a non-padding BSR.

Further, the processing module 601 is further configured to determine that the second data transmission resource is capable of accommodating all the data sent to the eNodeB, and that an idle resource further exists after the sending module 602 sends all the data and a MAC CE.

Specifically, the sending module 602 is specifically configured to send a padding D2D BSR by using the idle resource determined by the processing module.

It should be particularly noted that in this embodiment of the present invention, the processing module may be a processor and the sending module may be a transmitter.

Based on the foregoing technical solution, this embodiment of the present invention provides a transmission resource requesting method. If the first data transmission resource is capable of accommodating all device-to-device (D2D) data, a user equipment constructs a Media Access Control protocol data unit MAC PDU that does not include a D2D buffer status report BSR, so that the user equipment directly sends the MAC PDU to an eNodeB, and does not need to send a D2D BSR to the eNodeB. This omits a process in the prior art in which an eNodeB needs to send an uplink grant to a user equipment before the user equipment sends a BSR to the eNodeB, thereby reducing overloads of transmission resources between the eNodeB and the user equipment, and avoids a problem of an excessively long delay in requesting an uplink data data resource transmission resource by the user equipment from the eNodeB, thereby reducing a scheduling delay.

Figure 7:
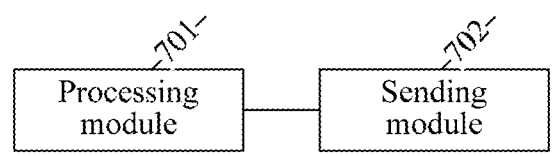
FIG. 7 is a schematic structural diagram of another transmission resource system according to an embodiment of the present invention.

FIG. 7 is a schematic structural diagram of a transmission resource system according to an embodiment of the present invention. It should be particularly noted that the embodiment shown in FIG. 7 may be used to perform the method embodiments shown in FIG. 10 and FIG. 15. The apparatus includes:

The processing module 701 is configured to determine that a device-to-device (D2D) buffer status report BSR is already triggered.

The processing module 701 is configured to obtain a first data transmission resource allocated by an evolved NodeB eNodeB. The first data resource is used for communication between a user equipment UE and the eNodeB.

The processing module 701 is configured to: when the obtained first data transmission resource is capable of accommodating first data, the first data is all data that needs to be sent by the user equipment to the eNodeB, and it is determined that the first data transmission resource is incapable of accommodating both the first data and the D2D BSR, cancel, by the user equipment, a sending state of the D2D BSR; or is configured to: when the obtained first data transmission resource is capable of accommodating the first data and is incapable of accommodating the first data and the D2D BSR, determine to send the first data first; or is configured to: when the obtained first data transmission resource is capable of accommodating the first data and the D2D BSR and the first data transmission resource is incapable of accommodating the first data, the D2D BSR, and a Media Access Control channel element MAC CE, determine to send the first data and the D2D BSR first.

The sending module 702 is configured to: when the processing module 701 determines to send the first data first, send the first data to the eNodeB; or is configured to: when the processing module 701 determines to send the first data and the D2D BSR, send the first data and the D2D BSR to the eNodeB.

Specifically, the MAC CE includes a BSR or a power headroom report needing to be sent to the eNodeB.

Specifically, the D2D BSR is a non-padding BSR.

Further, the processing module 701 is further configured to determine that the first data transmission resource is capable of accommodating the first data, and that an idle resource still exists after the first data and the MAC CE are sent; and the sending module 702 is further configured to send a padding D2D BSR on the idle resource determined by the processing module.

It should be particularly noted that in this embodiment of the present invention, the processing module may be a processor and the sending module may be a transmitter.

Based on the foregoing technical solution, this embodiment of the present invention provides a transmission resource requesting method. A user equipment determines that a device-to-device (D2D) buffer status report BSR is already triggered, the user equipment obtains a D2eNodeB data transmission resource allocated by an evolved NodeB eNodeB, and the user equipment determines a manner of processing the BSR according to whether data information can be accommodated by the D2eNodeB data transmission resource. This reduces overloads of transmission resources between the eNodeB and the user equipment, and avoids a problem of an excessively long delay in requesting an uplink data data resource transmission resource by the user equipment from the eNodeB, thereby reducing a scheduling delay.

Figure 8:
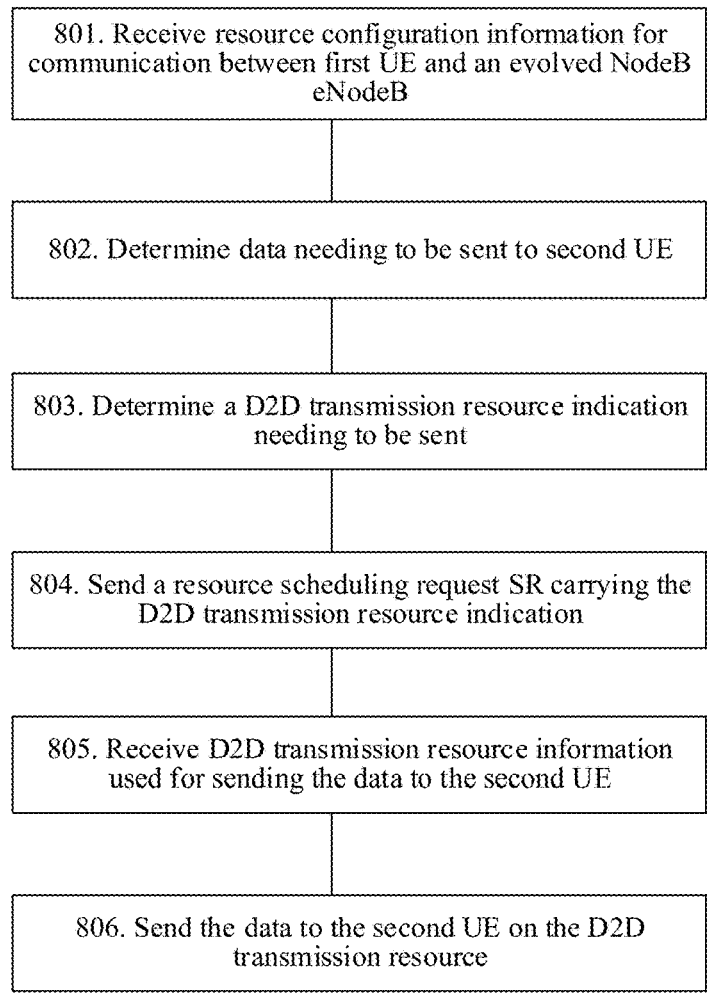
FIG. 8 is a schematic flowchart of a transmission resource requesting method according to an embodiment of the present invention.

FIG. 8 is a schematic flowchart of a transmission resource requesting method according to an embodiment of the present invention. The method includes the following steps.

801: A first user equipment UE receives resource configuration information for communication between a first user equipment and an evolved NodeB eNodeB.

Specifically, the first user equipment receives configuration information of a device-to-device physical scheduling request channel D2D PSRCH resource. The D2D PSRCH resource is used for communication between the first user equipment and the eNodeB.

802: The first user equipment determines data needing to be sent to a second user equipment.

803: The first user equipment determines a D2D transmission resource indication needing to be sent.

The first user equipment determines, according to a correspondence between resource information required for sending the data and a D2D transmission resource indication, the D2D transmission resource indication needing to be sent, specifically including:

determining, by the first user equipment according to a correspondence between a size of a D2D data volume needing to be sent and a D2D transmission resource indication, the D2D transmission resource indication needing to be sent; or determining, by the first user equipment according to a correspondence between a message type of D2D transmission data needing to be sent and a D2D transmission resource indication, the D2D transmission resource indication to be sent; or determining, by the first user equipment according to a correspondence between a priority of a D2D data message needing to be sent and a D2D transmission resource indication, the D2D transmission resource indication to be sent; or determining, by the first user equipment according to a correspondence between a service type of D2D data needing to be sent and a D2D transmission resource indication, the D2D transmission resource indication to be sent; or determining, by the first user equipment according to a correspondence between a logical channel of D2D data needing to be sent and a D2D transmission resource indication, the D2D transmission resource indication to be sent; or determining, by the first user equipment according to a correspondence between a logical channel group of D2D data needing to be sent and a D2D transmission resource indication, the D2D transmission resource indication to be sent.

804: The first user equipment sends, on a resource corresponding to the resource configuration information to the eNodeB, a resource scheduling request SR carrying the D2D transmission resource indication. The D2D transmission resource indication is used to request the eNodeB to allocate a D2D transmission resource to the first user equipment.

Further, before the first user equipment determines, according to information for the data, content of a D2D scheduling request needing to be sent, the first user equipment may obtain a preconfigured correspondence between data information and a D2D transmission resource indication.

805: The first user equipment receives D2D transmission resource information used for sending the data to the second user equipment. The D2D transmission resource information is allocated by the eNodeB according to the D2D transmission resource indication.

806: The first user equipment sends the data to the second user equipment on the D2D transmission resource.

Based on the foregoing technical solution, this embodiment of the present invention provides a transmission resource requesting method. A first user equipment determines a device-to-device (D2D) transmission resource indication needing to be sent, and sends the D2D transmission resource indication to an eNodeB, where the D2D transmission resource indication is used to request the eNodeB to allocate a D2D transmission resource to the first user equipment, so that the eNodeB allocates a transmission resource to the user equipment according to the received D2D transmission resource indication. This omits a process in the prior art in which an eNodeB needs to send an uplink grant to a first user equipment before the first user equipment sends a BSR to the eNodeB, thereby reducing overloads of transmission resources between the eNodeB and the user equipment, and avoids a problem of an excessively long delay in requesting a transmission resource by the first user equipment from the eNodeB, thereby reducing a scheduling delay.

Figure 9:
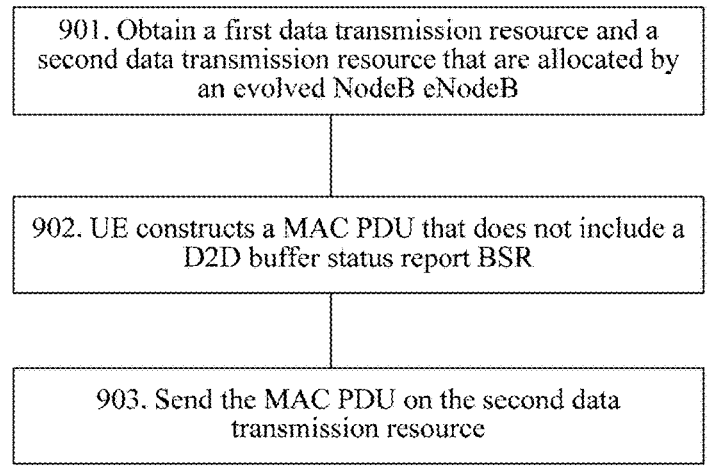
FIG. 9 is a schematic flowchart of another transmission resource requesting method according to an embodiment of the present invention.

FIG. 9 is a schematic flowchart of a transmission resource requesting method according to an embodiment of the present invention. The method includes the following steps.

901: A user equipment UE obtains a first data transmission resource and a second data transmission resource that are allocated by an evolved NodeB eNodeB. The first transmission resource is used for communication between the user equipment and another user equipment, and the second transmission resource is used for communication between the user equipment and the eNodeB.

902: If the first data transmission resource is capable of accommodating all device-to-device (D2D) data, the user equipment constructs a Media Access Control protocol data unit MAC PDU that does not include a D2D buffer status report BSR.

The D2D BSR is a non-padding BSR.

903: The user equipment sends the MAC PDU on the second data transmission resource.

Optionally, 904: If the second data transmission resource is capable of accommodating all the data that is sent by the user equipment to the eNodeB, and an idle resource still exists after the user equipment sends all the D2D data and a MAC CE to the eNodeB, the user equipment sends a padding D2D BSR by using the idle resource.

Based on the foregoing technical solution, this embodiment of the present invention provides a transmission resource requesting method. If the first data transmission resource is capable of accommodating all device-to-device (D2D) data, a user equipment constructs a Media Access Control protocol data unit MAC PDU that does not include a D2D buffer status report BSR, so that the user equipment directly sends the MAC PDU to an eNodeB, and does not need to send a D2D BSR to the eNodeB. This omits a process in the prior art in which an eNodeB needs to send an uplink grant to a user equipment before the user equipment sends a BSR to the eNodeB, thereby reducing overloads of transmission resources between the eNodeB and the user equipment, and avoids a problem of an excessively long delay in requesting a transmission resource by the user equipment from the eNodeB, thereby reducing a scheduling delay.

Figure 10:
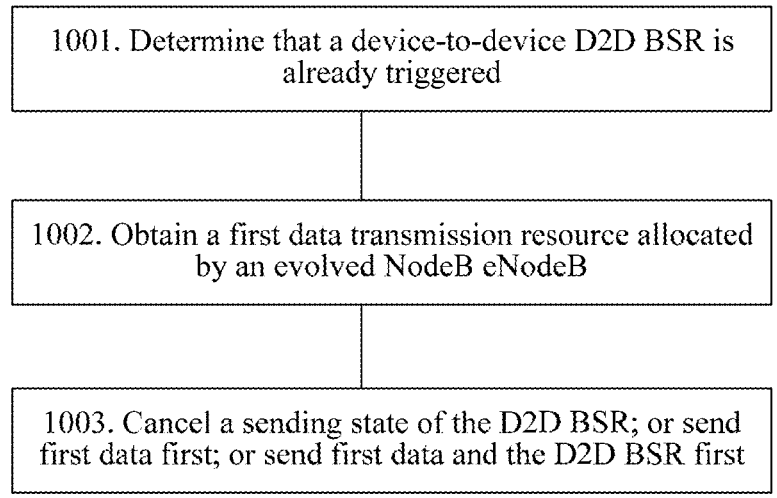
FIG. 10 is a schematic flowchart of another transmission resource requesting method according to an embodiment of the present invention.

FIG. 10 is a schematic flowchart of a transmission resource requesting method according to an embodiment of the present invention. The method includes the following steps.

1001: A user equipment UE determines that a device-to-device (D2D) buffer status report BSR is already triggered.

1002: The user equipment obtains a first data transmission resource allocated by an evolved NodeB eNodeB. The first data resource is used for communication between the user equipment and the eNodeB.

1003: When the first data transmission resource is capable of accommodating first data, the first data is all data that needs to be sent by the user equipment to the eNodeB, and it is determined that the first data transmission resource is incapable of accommodating both the first data and the D2D BSR, the user equipment cancels a sending state of the D2D BSR; or if the first data transmission resource is capable of accommodating the first data and is incapable of accommodating the first data and the D2D BSR, the user equipment sends the first data first; or if the first data transmission resource is capable of accommodating the first data and the D2D BSR and the first data transmission resource is incapable of accommodating the first data, the D2D BSR, and a Media Access Control channel element MAC CE, the user equipment sends the first data and the D2D BSR first.

The MAC CE includes a BSR or a power headroom report needing to be reported by the user equipment to the eNodeB.

The D2D BSR is a non-padding BSR.

Optionally, if the first data transmission resource is capable of accommodating the first data, and an idle resource still exists after the user equipment sends the first data and the MAC CE, the user equipment sends a padding D2D BSR by using the idle resource.

Based on the foregoing technical solution, this embodiment of the present invention provides a transmission resource requesting method. A user equipment determines that a device-to-device (D2D) buffer status report BSR is already triggered, the user equipment obtains a D2eNodeB data transmission resource allocated by an evolved NodeB eNodeB, and the user equipment determines a manner of processing the BSR according to whether data information can be accommodated by the D2eNodeB data transmission resource. This reduces overloads of transmission resources between the eNodeB and the user equipment, and avoids a problem of an excessively long delay in requesting a transmission resource by the user equipment from the eNodeB, thereby reducing a scheduling delay.

Figure 11:
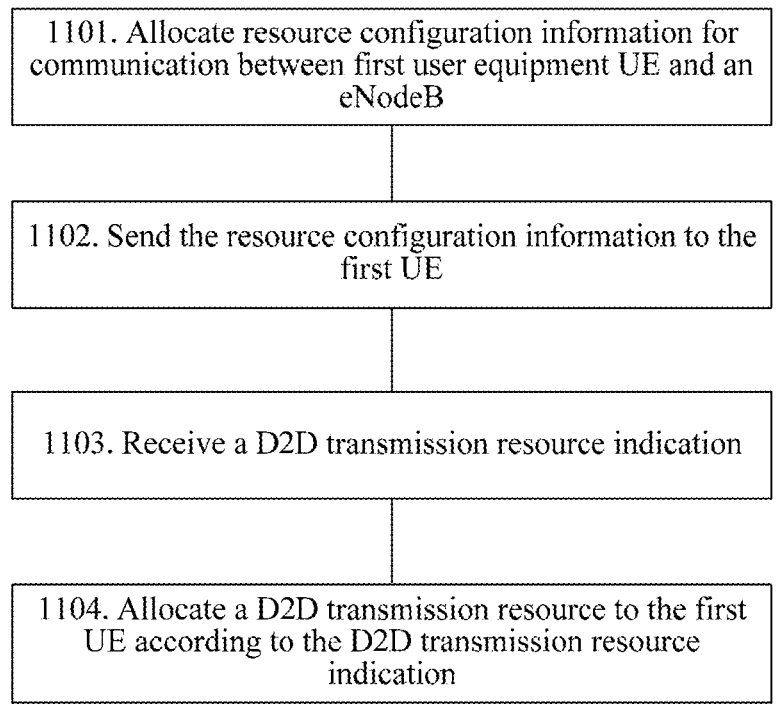
FIG. 11 is a schematic flowchart of another transmission resource requesting method according to an embodiment of the present invention.

FIG. 11 is a schematic flowchart of a transmission resource requesting method according to an embodiment of the present invention. The method includes the following steps.

1101: An evolved NodeB eNodeB allocates resource configuration information for communication between a first user equipment UE and the eNodeB.

1102: The eNodeB sends the resource configuration information to the first user equipment.

Specifically, the eNodeB sends configuration information of a device-to-device physical scheduling request channel D2D PSRCH resource to the first user equipment. The D2D PSRCH resource is used for communication between the first user equipment and the eNodeB.

1103: The eNodeB receives a resource scheduling request SR that is sent by the first user equipment on a resource corresponding to the resource configuration information. The SR carries a device-to-device (D2D) transmission resource indication.

1104: The eNodeB allocates a D2D transmission resource to the first user equipment according to the D2D transmission resource indication. The D2D transmission resource is used by the first user equipment to send data to a second user equipment.

The eNodeB allocates the D2D transmission resource information to the first user equipment according to a correspondence between the D2D transmission resource indication and resource information that is required for the first user equipment to send the data.

Specifically, the correspondence between the D2D transmission resource indication and the resource information that is required for the first user equipment to send the data includes:

a correspondence between the D2D transmission resource indication and a size of a D2D data volume needing to be sent by the first user equipment; or a correspondence between the D2D transmission resource indication and a message type of D2D transmission data needing to be sent by the first user equipment; or a correspondence between the D2D transmission resource indication and a priority of a D2D data message needing to be sent by the first user equipment; or a correspondence between the D2D transmission resource indication and a service type of D2D data needing to be sent by the first user equipment; or a correspondence between the D2D transmission resource indication and a logical channel of D2D data needing to be sent by the first user equipment; or a correspondence between the D2D transmission resource indication and a logical channel group of D2D data needing to be sent by the first user equipment.

1105: The eNodeB sends D2D transmission resource information to the first user equipment.

Optionally, the eNodeB may further preconfigure a correspondence between data information and D2D transmission resource indication information for the first user equipment.

Based on the foregoing technical solution, this embodiment of the present invention provides a transmission resource requesting method. A first user equipment determines a device-to-device (D2D) transmission resource indication needing to be sent, and sends the D2D transmission resource indication to an eNodeB, where the D2D transmission resource indication is used to request the eNodeB to allocate a D2D transmission resource to the first user equipment, so that the eNodeB allocates a transmission resource to the user equipment according to the received D2D transmission resource indication. This omits a process in the prior art in which an eNodeB needs to send an uplink grant to a first user equipment before the first user equipment sends a BSR to the eNodeB, thereby reducing overloads of transmission resources between the eNodeB and the user equipment, and avoids a problem of an excessively long delay in requesting a transmission resource by the first user equipment from the eNodeB, thereby reducing a scheduling delay.

Figure 12:
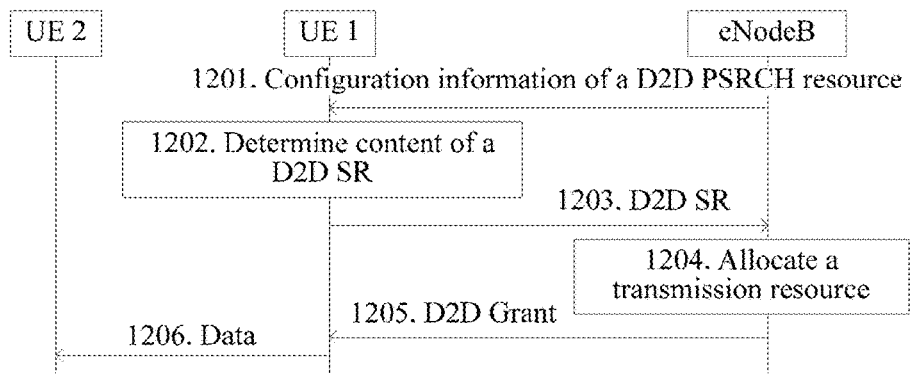
FIG. 12 is a schematic flowchart of a transmission resource requesting method according to an embodiment of the present invention.

FIG. 12 is a schematic flowchart of a transmission resource requesting method according to an embodiment of the present invention. The method may be applied to an application scenario shown in FIG. 2, or may be applied to another scenario, and this is not limited in the present invention. The method includes the following steps.

1201: An eNodeB sends configuration information of a D2D PSRCH resource to UE 1.

The D2D PSRCH resource is used for communication between first user equipment and the eNodeB.

1202: UE 1 determines, according to a correspondence between information for data needing to be sent and a D2D transmission resource indication, a D2D transmission resource indication needing to be sent.

It should be particularly noted that, the correspondence between the information for the data needing to be sent and the D2D transmission resource indication may be preconfigured by the eNodeB for UE 1, or may be configured by the base station and then notified to UE 1, or may be statically configured in the user equipment. The correspondence between the information for the data needing to be sent and the D2D transmission resource indication is not limited in the present invention.

Specifically, UE 1 determines, according to a correspondence between an interface through which data needs to be transmitted and a D2D transmission resource indication, the D2D transmission resource indication needing to be sent. As shown in Table 1:

TABLE 1

| Interface through which data needs to be transmitted by UE 1 | D2D transmission resource indication |
|---|---|
| Requesting a transmission resource from the user equipment to an eNodeB | 0 |
| Requesting a transmission resource from the user equipment to another user equipment | 1 |

Specifically, UE 1 determines, according to a correspondence between a D2D data volume needing to be transmitted and a D2D transmission resource indication, the D2D transmission resource indication to be sent. As shown in Table 2:

TABLE 2

| D2D data volume needing to be transmitted by UE 1 | D2D transmission resource indication |
|---|---|
| Buffered D2D data volume <= 100 bytes | 00 |
| 100 bytes < Buffered D2D data volume <= 200 bytes | 01 |
| 200 bytes < Buffered D2D data volume <= 300 bytes | 10 |
| 300 bytes < Buffered D2D data volume | 11 |

Specifically, UE 1 may determine, according to a correspondence between a message type of D2D transmission data needing to be sent and a D2D transmission resource indication, the D2D transmission resource indication to be sent. As shown in Table 3:

TABLE 3

| D2D message type needing to be transmitted by UE 1 | D2D transmission resource indication |
|---|---|
| V2V CAM High Frequency Message | 00 |
| V2V CAM Low Frequency Message | 01 |
| V2V DENM Message | 10 |

Specifically, UE 1 may determine, according to a correspondence between a priority of a D2D message type needing to be transmitted and a D2D transmission resource indication, the D2D transmission resource indication to be sent. As shown in Table 4:

TABLE 4

| Priority of a D2D message needing to be transmitted by UE 1 | D2D transmission resource indication |
|---|---|
| D2D message having a high priority | 00 |
| D2D message having an intermediate priority | 01 |
| D2D message having a low priority | 10 |

Specifically, UE 1 determines, according to a correspondence between an extra resource amount needed by a D2D message needing to be transmitted and a D2D transmission resource indication, the D2D transmission resource indication to be sent. As shown in Table 5:

TABLE 5

| Extra resource amount needed by a D2D message needing to be transmitted by UE 1 | D2D transmission resource indication |
|---|---|
| Current resources are insufficient, and 100 bytes need to be additionally requested | 00 |
| Current resources are insufficient, and 200 bytes need to be additionally requested | 01 |
| Current resources are insufficient, and 300 bytes need to be additionally requested | 10 |
| Current resources are insufficient, and 400 bytes need to be additionally requested | 11 |

Specifically, UE 1 determines the D2D transmission resource indication according to a correspondence between a D2D service type needing to be transmitted and a D2D transmission resource indication. As shown in Table 6:

TABLE 6

| D2D service type needing to be transmitted by UE 1 | D2D transmission resource indication |
| --- | --- |
| Security service | 00 |
| Non-security service | 01 |

Specifically, UE 1 needs to determine, according to a correspondence between a type of a D2D message needing to be transmitted and a D2D transmission resource indication, the D2D transmission resource indication needing to be sent. As shown in Table 7:

TABLE 7

| Type of a D2D message needing to be transmitted by UE 1 | D2D transmission resource indication |
| --- | --- |
| Requested transmission resource of 300 bytes of a V2V low-delay message or emergency message | 0 |
| Non-V2V low-delay message or emergency message | 1 |

Specifically, UE 1 may determine, according to a correspondence between a logical channel of a D2D message needing to be transmitted and a D2D transmission resource indication, the D2D transmission resource indication to be sent. As shown in Table 8:

TABLE 8

| Logical channel of a D2D message needing to be transmitted by UE 1 | D2D transmission resource indication |
| --- | --- |
| Logical channel 1 | 00 |
| Logical channel 2 | 01 |
| Logical channel 3 | 10 |
| Logical channel 4 | 11 |

Specifically, UE 1 may determine, according to a correspondence between a logical channel group of D2D data needing to be sent and a D2D transmission resource indication, the D2D transmission resource indication to be sent. As shown in Table 9:

TABLE 9

| Logical channel group of a D2D message needing to be transmitted by UE 1 | D2D transmission resource indication |
| --- | --- |
| Logical channel group 1 | 00 |
| Logical channel group 2 | 01 |
| Logical channel group 3 | 10 |
| Logical channel group 4 | 11 |

1203: UE 1 sends the determined D2D transmission resource indication to the eNodeB according to the configuration information of the D2D PSRCH resource.

Specifically, after D2D data reaches on UE 1, when a condition is met, a D2D BSR is triggered. If UE 1 has no uplink transmission resource for sending the D2D BSR, a D2D scheduling request is triggered. If UE 1 has a transmission resource for sending the D2D scheduling request, the D2D scheduling request is sent to the eNodeB on a corresponding D2D scheduling request transmission resource. The sending of the D2D scheduling request represents that UE 1 buffers uplink data and a D2D BSR is triggered, and the eNodeB needs to allocate a D2D transmission resource to be used to send the uplink data.

The D2D scheduling request is used to request the D2D transmission resource from the base station, and the D2D transmission resource is used by UE 1 to send data to UE 2.

The configuration information of the D2D PSRCH resource includes at least one of the following:

time-frequency resource location information of a PSRCH, which may specifically include at least one of a subframe location of the PSRCH, a physical resource block location of the PSRCH, a resource configuration period of the PSRCH, or a resource offset in the configuration period;

time-domain resource location information of the PSRCH and frequency-domain resource location information of the PSRCH;

radio subframe information of the PSRCH and a subcarrier location information of the PSRCH;

radio subframe information of the PSRCH and a physical resource block location information of the PSRCH;

radio resource index information of the PSRCH;

radio subframe information of the PSRCH, and a subcarrier location information and a configuration period of the PSRCH;

radio subframe information of the PSRCH, and a physical resource block location information and a configuration period of the PSRCH;

radio resource index information and a configuration period of the PSRCH;

a configuration period of the PSRCH, and a subframe offset and frequency domain resource location information that are in the configuration period;

a configuration period of the PSRCH, and a subframe offset and subcarrier location information that are in the configuration period; and a configuration period of the PSRCH, and a subframe offset and physical resource block location information that are in the configuration period.

It should be particularly noted that the foregoing listed configuration information of the D2D PSRCH resource is merely an example given in this embodiment of the present invention. The configuration information of the D2D PSRCH resource in the present invention includes, but is not limited to, the foregoing descriptions.

1204: After receiving the D2D transmission resource indication, the eNodeB allocates a transmission resource to UE 1 according to the D2D transmission resource indication.

Specifically, the eNodeB specifically allocates the transmission resource to UE 1 according to the D2D transmission resource indication in any one of the following manners:

Manner 1: If the D2D transmission resource indication is used to request a transmission resource for a transmission interface corresponding to the D2D transmission resource indication, the eNodeB allocates a specific transmission interface resource to UE 1.

Specifically, referring to Table 1, an interface that needs to be used by UE 1 to transmit data is determined by using different D2D transmission resource indications.

Manner 2: If the D2D transmission resource indication is used to identify a size of a data volume, the eNodeB allocates a transmission resource to UE 1 according to the data volume identified by the D2D transmission resource indication.

For example, in Table 2, if a D2D transmission resource indication received by the eNodeB is 01, indicating that a data volume buffered by the user equipment ranges from 100 bytes to 200 bytes, the eNodeB may allocate a D2D transmission resource that is not less than 100 bytes and not greater than 200 bytes to UE 1.

If the D2D transmission resource allocated by the eNodeB is insufficient to transmit all D2D data, the user equipment transmits the D2D data only according to a size of a data volume that can be accommodated by the D2D transmission resource allocated by the eNodeB.

Manner 3: If the D2D transmission resource indication is used to identify a type of a buffered message, the eNodeB allocates a transmission resource to UE 1 according to the type, of the buffered message, identified by the D2D transmission resource indication.

Specifically, referring to Table 2, the type of the buffered message is identified, by using the D2D transmission resource indication, as the transmission resource that is allocated by UE 1 and that corresponds to the type of the message. For example, if the D2D transmission resource indication is 00, it indicates that a current to-be-sent message is a high frequency message in a V2V CAM (cooperative awareness message), and a transmission resource for sending the high frequency message in the V2V CAM ranges from 100 bytes to 150 bytes. Therefore, the eNodeB may allocate, to UE 1 according to a type of the high frequency message in the V2V CAM, a transmission resource that can be used to transmit data greater than or equal to 150 bytes.

For another example, as shown in Table 3, if a current D2D transmission resource indication is 01, it indicates that the currently to-be-sent message is a low frequency message in the V2V CAM, and sending the low frequency message in the V2V CAM generally needs a transmission resource having 500 bytes to 700 bytes. Therefore, the eNodeB may allocate a 700-byte transmission resource to UE 1 according to the low frequency message in the V2V CAM.

Manner 4: If the D2D transmission resource indication is used to identify a priority of a message needing to be sent, the eNodeB allocates a transmission resource to UE 1 according to the priority identified by the D2D transmission resource indication.

Specifically, referring to Table 4, a transmission resource is allocated to the user equipment according to the priority of the to-be-sent message identified by the D2D transmission resource indication. For example, when the D2D transmission resource indication is 00, it indicates that the current to-be-sent message has a highest priority, and the eNodeB may preferentially allocate a transmission resource to UE 1 according to the D2D transmission resource indication.

Manner 5: If the D2D transmission resource indication is used to identify a resource amount needing to be additionally requested, the eNodeB allocates a transmission resource to UE 1 according to the additionally requested resource amount identified by the D2D transmission resource indication.

It should be particularly noted that, the eNodeB may allocate a semi-static resource to UE 1, and UE 1 may periodically use the configured semi-static resource. However, a size of a data packet is changeable. Therefore, a size of a data packet needing to be sent by UE 1 is not fixed, and a case in which the semi-static resource is insufficient to send the buffered data. Therefore, in this case, manner 6 may be used to allocate the transmission resource.

Specifically, referring to Table 5, the additionally requested resource amount is allocated to UE 1 according to the D2D transmission resource indication. For example, when the D2D transmission resource indication is 00, indicating that the additionally requested resource amount is 100 bytes, the eNodeB may allocate a 100-byte transmission resource to UE 1.

Manner 6: If the D2D transmission resource indication is used to identify a type of a service, the eNodeB allocates a transmission resource to UE 1 according to the type, which is identified by the D2D transmission resource indication, of the service.

Specifically, referring to Table 6, a transmission resource corresponding to the type of the service is allocated to UE 1 according to different D2D transmission resource indications. For example, when the D2D transmission resource indication is 00, it indicates that the current to-be-sent service is a security service, and the eNodeB may allocate a transmission resource to UE 1 according to the type of the service of the D2D transmission resource indication.

It should be particularly noted that the D2D transmission resource indication may be configured by a base station for user equipment, or may be notified through broadcasting by a system, or may be preconfigured in user equipment. These configuration manners are only examples given in the present invention. The present invention includes these configuration manners, but is not limited thereto, as long as it can be learned that content represented by the D2D transmission resource indication belongs to the protection scope of the present invention. Details are not described herein again.

1205: The eNodeB sends scheduling information of a D2D data transmission resource to UE 1.

Optionally, the scheduling information may further include a scheduling control information resource for sending D2D data by UE 1 to UE 2.

1206: UE 1 sends data to UE 2.

Optionally, UE 1 sends, to UE 2, the scheduling control information for transmitting data.

Based on the foregoing technical solution, this embodiment of the present invention provides a transmission resource requesting method. A first user equipment determines a device-to-device (D2D) transmission resource indication needing to be sent, and sends the D2D transmission resource indication to an eNodeB, where the D2D transmission resource indication is used to request the eNodeB to allocate a D2D transmission resource to the first user equipment, so that the eNodeB allocates a transmission resource to the user equipment according to the received D2D transmission resource indication. This omits a process in the prior art in which an eNodeB needs to send an uplink grant to a first user equipment before the first user equipment sends a BSR to the eNodeB, thereby reducing overloads of transmission resources between the eNodeB and the user equipment, and avoids a problem of an excessively long delay in requesting a transmission resource by the first user equipment from the eNodeB, thereby reducing a scheduling delay.

Figure 13:
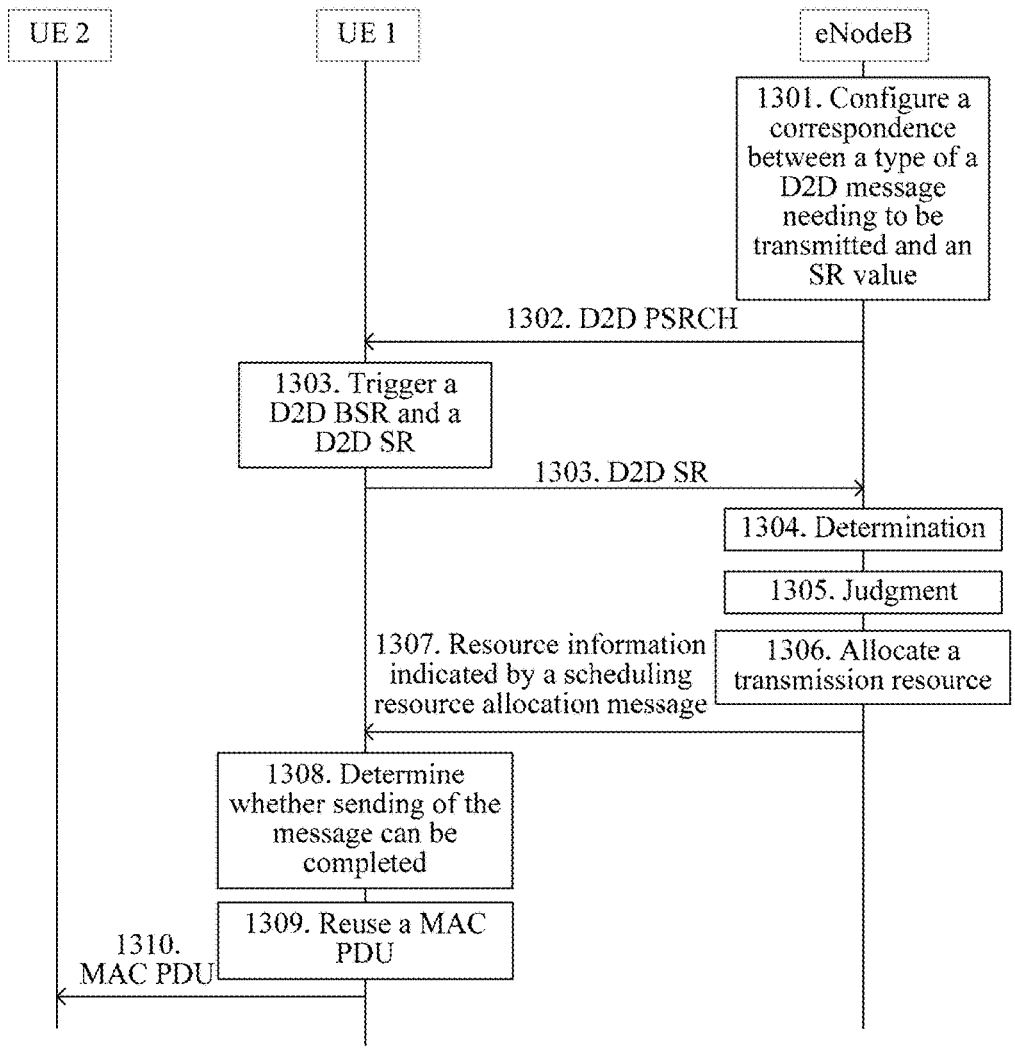
FIG. 13 is a schematic flowchart of another transmission resource requesting method according to an embodiment of the present invention.

FIG. 13 is a schematic flowchart of another transmission resource requesting method according to an embodiment of the present invention. The method includes the following steps.

First, it should be particularly noted that a D2eNodeB transmission resource refers to a resource needed when data transmission is performed between a user equipment and a base station.

1301: An eNodeB configures, for UE 1, a correspondence between a type of a D2D message needing to be transmitted and a D2D transmission resource indication.

Optionally, the correspondence between a type of a D2D message and a D2D transmission resource indication may be shown in Table 10:

TABLE 10

| Type of a D2D message needing to be transmitted by UE 1 | D2D transmission resource indication |
|---|---|
| Requested transmission resource of 300 bytes of a low-delay message or emergency message | 0 |
| Non-low-delay message or non-emergency message | 1 |

1302: The eNodeB sends configuration information of a D2D PSRCH resource to UE 1. The configuration information of the D2D PSRCH resource includes the correspondence between a type of a D2D message and a D2D transmission resource indication.

1303: When UE 1 generates a low-delay message or an emergency D2D message, the user equipment triggers a D2D BSR and a D2D scheduling request, and UE 1 sends the D2D transmission resource indication on the D2D PSRCH transmission resource, where when D2D transmission resource indication is 0, procedure 1 is performed; or when UE 1 generates a non-low-delay or non-emergency D2D message, the user equipment triggers a D2D BSR and a D2D scheduling request, and UE 1 sends D2D scheduling request information on a D2D scheduling request transmission resource, where when the D2D transmission resource indication is 1, procedure 2 is performed.

Specifically, procedure 1 may include the following steps.

1304: When the eNodeB receives the D2D scheduling request sent by UE 1, and the D2D transmission resource indication is 0, the eNodeB determines that UE 1 buffers a low-delay message or an emergency message needing to be sent, and a D2D transmission resource having at least 300 bytes needs to be allocated, so that a transmission requirement of the low-delay message or an emergency message can be met.

1305: The eNodeB determines whether sufficient transmission resources can be currently allocated to UE 1, so as to be used to send the low-delay message or emergency message.

Specifically, the eNodeB may determine, according to a current load status, whether sufficient transmission resources can be allocated to the user equipment. The transmission resource is used to send the low-delay message or emergency message.

1306: If a determining result of step 1305 is yes, the eNodeB allocates, to the user equipment, sufficient transmission resources for sending the low-delay message or emergency message, and the eNodeB sends a scheduling resource allocation message to the user equipment, where the scheduling resource allocation message indicates transmission resource information allocated to the user equipment; or if a determining result of step 1305 is no, the eNodeB allocates, to the user equipment, a transmission resource for sending the D2D BSR, and the eNodeB sends a scheduling resource allocation message to the user equipment, where the scheduling resource allocation message indicates transmission resource information of the D2D BSR allocated to the user equipment.

Specifically, in preference to another service, the eNodeB requests to allocate, to UE 1, a transmission resource for sending the low-delay message and emergency message.

1307: UE 1 receives a D2eNodeB scheduling resource allocation message sent by the eNodeB, and obtains a D2eNodeB transmission resource indicated by the D2eNodeB scheduling resource allocation message.

1308: When UE 1 assembles a MAC PDU to be sent to the eNodeB, UE 1 determines whether the obtained D2D transmission resource is sufficient to complete sending of the emergency message or low-delay message.

1309: If UE 1 determines that the obtained D2D transmission resource is sufficient to complete sending of the emergency message or low-delay message, the user equipment cancels triggering of the D2D BSR, or if UE 1 determines that the obtained D2D transmission resource is sufficient to complete sending of the emergency message or low-delay message, UE 1 reports that the D2D BSR is 0; or if the user equipment determines that a transmission resource obtained within a current transmission time interval is insufficient to complete sending of the emergency message or low-delay message, the user equipment reuses, in the MAC PDU sent by the user equipment to the eNodeB, a D2D BSR corresponding to buffering information of the emergency message.

1310: UE 1 sends the MAC PDU to the eNodeB.

Figure 14:
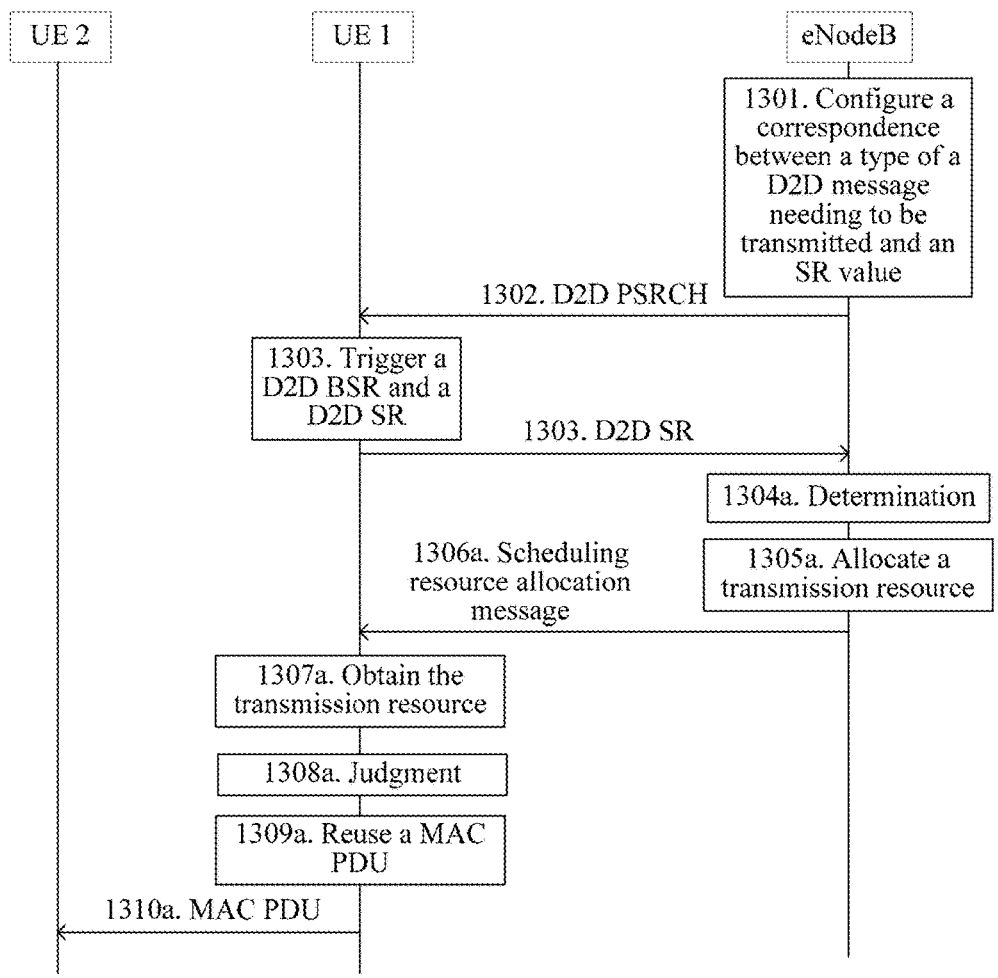
FIG. 14 is a schematic flowchart of another transmission resource requesting method according to an embodiment of the present invention.

Specifically, as shown in FIG. 14, procedure 2 includes:

1304a: When the eNodeB receives a D2D scheduling request sent by UE 1, and the D2D transmission resource indication is 1, the eNodeB determines, according to a correspondence between a type of a D2D message needing to be transmitted and a D2D transmission resource indication, that UE 1 currently needs to send a non-low-delay D2D message or a non-emergency D2D message.

1305a: The eNodeB allocates a transmission resource to UE 1. The transmission resource is used to send a D2D BSR.

1306a: The eNodeB sends a scheduling resource allocation message to UE 1. The scheduling resource allocation message indicates D2eNodeB transmission resource information allocated to UE 1.

1307a: UE 1 receives the scheduling resource allocation message sent by the eNodeB, and obtains a D2eNodeB transmission resource indicated by the scheduling resource allocation message.

1308a: When UE 1 assembles a MAC PDU sent by the user equipment to the eNodeB, UE 1 determines whether the obtained D2D transmission resource is sufficient to send the non-low-delay message or non-emergency message, or whether sending of the non-low-delay message or non-emergency message is completed.

1309a: If a determining result of step 608a is yes, UE 1 cancels triggering of the D2D BSR, or reports that the D2D BSR is 0; or if a determining result of step 608a is no, UE 1 reuses, in the MAC PDU, a D2D BSR corresponding to a buffered data volume of the non-low-delay message or non-emergency message.

1310a: After completing reusing of the MAC PDU, UE 1 sends the MAC PDU to the eNodeB.

Based on the foregoing technical solution, in a transmission resource requesting method in this embodiment of the present invention, an eNodeB allocates a transmission resource to UE 1 according to a D2D transmission resource indication, and if transmission resources are sufficient, UE 1 omits or cancels sending of a D2D BSR, thereby reducing overloads of transmission resources between an eNodeB and a user equipment, and avoids a problem of an excessively long delay in requesting an uplink data data resource transmission resource by the UE 1 from the eNodeB, thereby reducing a scheduling delay.

In another implementable manner of this embodiment of the present invention, referring to Table 9, an eNodeB may also learn, according to a correspondence between a logical channel and a D2D transmission resource indication, an emergency degree of a message needing to be sent by a user equipment. Specifically, the eNodeB may preset a correspondence between a priority of a logical channel and a D2D transmission resource indication, or specify a correspondence between a priority of a logical channel and a D2D transmission resource indication by using a protocol. For a specific procedure and advantageous effects, refer to an embodiment shown in FIG. 13, and details are not described herein.

In another implementable manner of this embodiment of the present invention, referring to Table 13, an eNodeB may also learn, according to a correspondence between a logical channel group and a D2D transmission resource indication, an emergency degree of a message needing to be sent by a user equipment. Specifically, the eNodeB may preset a correspondence between a priority of a logical channel and a D2D transmission resource indication, or specify a correspondence between a priority of a logical channel and a D2D transmission resource indication by using a protocol. For a specific procedure and advantageous effects, refer to an embodiment shown in FIG. 13, and details are not described herein.

In another implementable manner of this embodiment of the present invention, according to the foregoing configuration, in specific implementation, multiple correspondences between a logical channel group or a logical channel and a D2D transmission resource indication are not necessarily configured, but at least one correspondence between a logical channel group or a logical channel and a D2D transmission resource indication may be configured, as shown in Table 11:

TABLE 11

| Logical channel group of a D2D message needing to be transmitted by UE 1 | D2D transmission resource indication |
|---|---|
| Logical channel group 1 (emergency message 300 bytes) | 00 |
| Logical channel group 2 (high frequency message 150 bytes) | 01 |
| Logical channel group 3 (low frequency message 700 bytes) | 10 |
| Logical channel group 4 (another message) | 11 |

For a specific procedure and advantageous effects of the embodiment, refer to the embodiment shown in FIG. 13, and details are not described herein.

A D2D BSR mentioned in the present invention may be a user equipment BSR corresponding to all D2D data in one user equipment, or may be a logical channel group BSR corresponding to one logical channel group in one user equipment; or may be a logical channel BSR corresponding to one logical channel in one user equipment, or may be a grouping BSR corresponding to a user equipment grouping device in one user equipment. This is not specifically limited in the present invention.

Based on the foregoing technical solution, this embodiment of the present invention provides a transmission resource requesting method. If the first data transmission resource is capable of accommodating all device-to-device (D2D) data, a user equipment constructs a Media Access Control protocol data unit MAC PDU that does not include a D2D buffer status report BSR, so that the user equipment directly sends the MAC PDU to an eNodeB, and does not need to send the D2D BSR to the eNodeB. This omits a process in the prior art in which an eNodeB needs to send an uplink grant to a user equipment before the user equipment sends a BSR to the eNodeB, thereby reducing overloads of transmission resources between the eNodeB and the user equipment, and avoids a problem of an excessively long delay in requesting an uplink data data resource transmission resource by the user equipment from the eNodeB, thereby reducing a scheduling delay.

Figure 15:
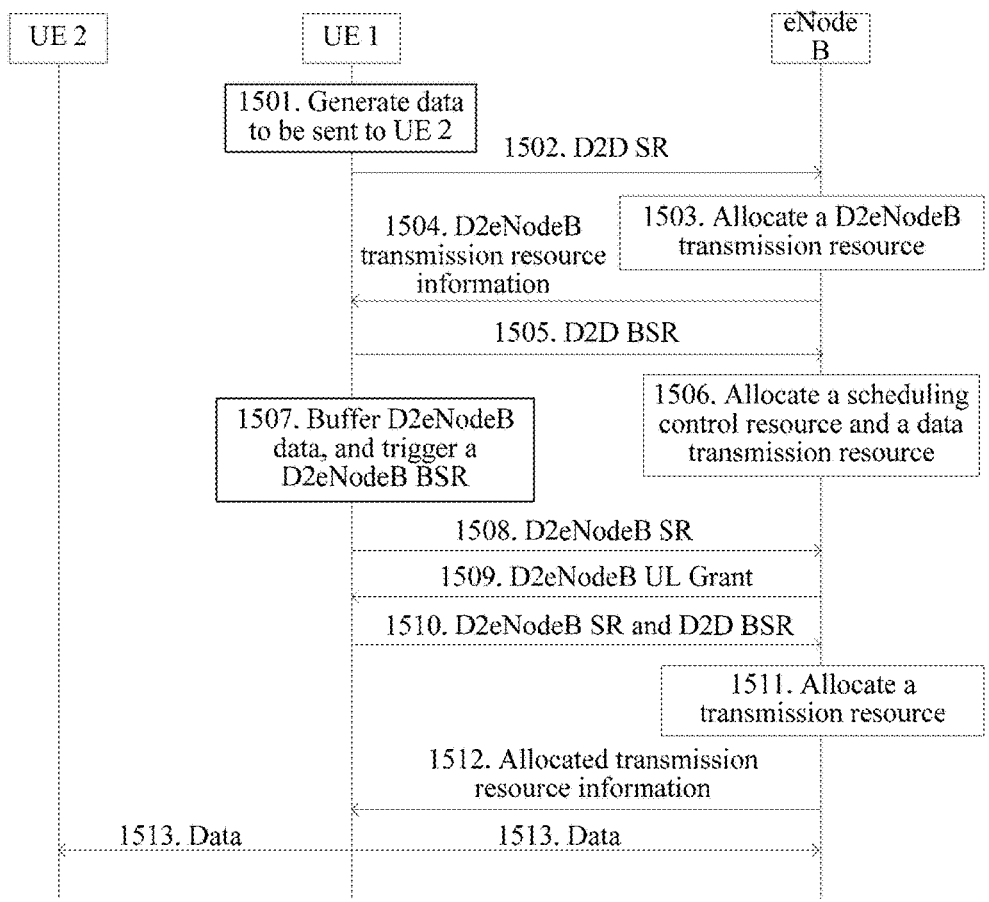
FIG. 15 is a schematic flowchart of a transmission resource requesting method according to an embodiment of the present invention.

FIG. 15 is a schematic flowchart of a transmission resource requesting method according to an embodiment of the present invention. The instance includes:

1501: UE 1 generates data needing to be sent to UE 2.
1502: UE 1 sends a scheduling request to an eNodeB.
1503: After the eNodeB receives the scheduling request, the eNodeB allocates a D2eNodeB transmission resource to UE 1. The D2eNodeB transmission resource is used UE 1 to report, to the eNodeB, information about a to-be-sent D2D data volume buffered by UE 1.
1504: The eNodeB sends allocated D2eNodeB transmission resource information to UE 1.
1505: UE 1 sends a D2D BSR to the eNodeB on an uplink resource corresponding to the D2eNodeB transmission resource.
1506: The eNodeB allocates a data transmission resource to UE 1 according to the received D2D BSR. The data transmission resource optionally includes a scheduling control resource, and the data transmission resource is used by UE 1 to send data to UE 2.
1507: UE 1 buffers D2eNodeB data, and UE 1 triggers sending of a D2eNodeB BSR.
1508: UE 1 sends a D2eNodeB scheduling request to the eNodeB.
1509: The eNodeB sends an uplink data transmission resource of a D2eNodeB UL Grant to UE 1.
1510: UE 1 sends the D2eNodeB BSR and/or the D2D BSR to the base station.

It should be particularly noted that, in step 1510, whether the D2D BSR is to be sent needs to be determined according to any one of the following rules:

Rule 1: UE 1 determines whether a current D2D BSR is triggered, and if the D2D BSR is triggered, determines to send the D2D BSR to the eNodeB. The D2D BSR is used to notify the eNodeB of a size of a D2D data transmission resource needing to be allocated.

The D2D BSR may indicate a size of a D2D data transmission resource. Further, UE 1 may obtain the size of the D2D data transmission resource in the following manner, for example:

subtracting, from a currently buffered D2D data volume, a size of D2D data that is already allocated by the eNodeB to UE 1.

Optionally, the D2D data transmission resource may be identified in the D2D BSR by using D2D device groups as units, and details are as follows:

the D2D BSR may include multiple different D2D Group BSR values, and D2D BSR data of different D2D groups may be calculated separately, that is, a size of a data volume that can be sent by a D2D resource, which can be obtained, of a group is subtracted from a buffered data volume of the group.

Specifically, a D2D transmission resource that is already allocated by the eNodeB to UE 1 may be 100 bytes, where
a data volume buffered in D2D Group A is 70 bytes;
a data volume buffered in D2D Group B is 50 bytes; and
a data volume buffered in D2D Group C is 40 bytes, where
a priority of D2D Group A is higher than that of D2D Group B, and a priority of D2D Group B is higher than that of D2D Group C; therefore, the D2D BSR includes D2D Group A, D2D Group A identifies a size of a D2D data transmission resource as 0, a size of a D2D data transmission resource in a D2D Group B BSR is identified as 50−(100−70)=20 bytes, and a size of a D2D data transmission resource in a D2D Group C BSR is identified as 40 bytes.

Optionally, a size of a D2D data transmission resource identified in a D2D BSR may use units of logical channel groups, that is, may be calculated by using different logical channel groups separately, and details are as follows:

a data volume buffered in logical channel group (LCG) A is 70 bytes;
a data volume buffered in LCG B is 50 bytes; and
a data volume buffered in LCG C is 40 bytes, where
for example, a priority of the logical channel group (LCG) A is higher than that of LCG B; therefore, the D2D BSR of UE 1 includes an LCG A BSR, the LCG A BSR identifies a size of a D2D data transmission resource as 0, an LCG B BSR identifies a size of a D2D data transmission resource as 50−(100−70)=20 bytes, and an LCG C BSR identifies a size of a D2D data transmission resource as 40 bytes.

Rule 2: UE 1 determines whether a current D2D BSR is triggered, and if the D2D BSR is already triggered, and a currently obtained D2D transmission resource is sufficient to be used to transmit buffered D2D data, the user equipment cancels a triggered state of the D2D BSR.

Rule 3: UE 1 determines whether a current D2D BSR is triggered, and if the D2D BSR is already triggered, and a currently obtained D2D transmission resource is sufficient to be used to transmit buffered D2D data, the triggered D2D BSR is not used by the user equipment in this uplink transmission.

Rule 4: UE 1 determines whether a current D2D BSR is triggered, and if the D2D BSR is already triggered, and the currently obtained D2eNodeB transmission resource is capable of accommodating buffered D2eNodeB data and a MAC CE, but is incapable of accommodating the D2eNodeB, a MAC CE having another priority, and the D2D BSR, the user equipment cancels a triggered state of the D2D BSR. The priority of the MAC CE is higher than that of the buffered D2eNodeB data.

Rule 5: UE 1 determines whether a current D2D BSR is triggered, and if the D2D BSR is already triggered, and the currently obtained D2eNodeB transmission resource is capable of accommodating buffered D2eNodeB data and a MAC CE, but is incapable of accommodating the D2eNodeB, the MAC CE, and the D2D BSR, the D2D BSR is not used by the user equipment in this uplink transmission. The MAC CE has a priority higher than that of the buffered D2eNodeB data.

Rule 6: UE 1 determines whether the current D2D BSR is triggered, and if the D2D BSR is already triggered, and a currently obtained D2eNodeB transmission resource is capable of accommodating transmitted buffered D2eNodeB data and the D2D BSR, but is incapable of accommodating all buffered D2eNodeB data, the D2D BSR, and the D2eNodeB BSR, a user equipment does not include the triggered D2eNodeB BSR in this uplink transmission.

Rule 7: After determining that a MAC CE and/or D2eNodeB data need to be sent, if a remaining transmission resource still exists, and if the remaining transmission resource can bear D2D BSR information, in this case, UE 1 may trigger a padding D2D BSR.

It should be particularly noted that, a BSR is not triggered by the user equipment until data needs to be sent. For example, when D2eNodeB data needs to be sent, a D2eNodeB BSR is triggered. When D2D data needs to be sent, a D2D BSR is triggered. Alternatively, no matter whether data needs to be sent, if an idle resource still can accommodate the D2D BSR after reusing of a MAC control element having a high priority and the D2eNodeB data is completed, the padding D2D BSR is triggered. After the padding D2D BSR is triggered, a reporting manner of the padding D2D BSR is similar to manner 1 or manner 2, and details are not described herein again.

1511: The eNodeB allocates a D2eNodeB transmission resource to UE 1 according to the D2eNodeB BSR; and/or the eNodeB allocates a D2D transmission resource to UE 1 according to the D2D BSR.

1512: The eNodeB sends D2eNodeB scheduling information to UE 1, to notify UE 1 of information about the allocated D2eNodeB transmission resource; and/or the eNodeB sends the D2D scheduling information to UE 1, to notify UE 1 of information about the allocated D2D transmission resource.

1513: UE 1 sends the D2eNodeB data to the eNodeB on the allocated D2eNodeB resource; and/or UE 1 sends the D2D data to UE 2 on the allocated D2D resource.

Based on the foregoing technical solution, this embodiment of the present invention provides a transmission resource requesting method. A user equipment determines that a device-to-device (D2D) buffer status report BSR is already triggered, the user equipment obtains a D2eNodeB data transmission resource allocated by an evolved NodeB eNodeB, and the user equipment determines a manner of processing the BSR according to whether data information can be accommodated by the D2eNodeB data transmission resource. This reduces overloads of transmission resources between the eNodeB and the user equipment, and avoids a problem of an excessively long delay in requesting an uplink data data resource transmission resource by the user equipment from the eNodeB, thereby reducing a scheduling delay.

It should be particularly noted that the D2eNodeB BSR refers to a BSR that needs to be sent by the user equipment to the eNodeB, and for convenience of description, is referred to as a D2eNodeB BSR for short in this embodiment of the present invention. The D2eNodeB transmission resource refers to a BSR that needs to be sent by the user equipment to the eNodeB, and for convenience of description, is referred to as a D2eNodeB transmission resource for short in this embodiment of the present invention. The D2eNodeB scheduling request refers to a scheduling request that needs to be sent by the user equipment to the eNodeB, and for convenience of description, is referred to as a D2eNodeB scheduling request for short in this embodiment of the present invention. A D2eNodeB UL Grant refers to a UL Grant that needs to be sent by the user equipment to the eNodeB, and for convenience of description, is referred to as D2eNodeB UL Grant.

It should be particularly noted that, in this embodiment of the present invention, a non-padding BSR may be referred to as a normal BSR, and such a BSR is triggered by data in a buffer. For example, when a buffer having no data receives data (at arrival of data), a regular BSR is triggered. There is also a periodic BS. If there is data in a buffer, the periodic BSR is periodically triggered. Both the regular and periodic BSRs are normal BSRs, and such a BSR has a relatively high priority that is higher than a priority of data. A padding BSR is referred to as a BSR for padding in standards, and is a BSR used to fill a remaining resource. If there is no sufficient remaining resource or there is no remaining resource, no padding BSR is triggered.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing descriptions are merely specific exemplary embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:

1. A first user equipment, comprising a processor and a non-transitory computer-readable medium having processor-executable instructions stored thereon, wherein the processor-executable instructions, when executed by the processor, facilitate:

receiving, by the first user equipment, resource configuration information of a device-to-device physical scheduling request channel (D2D PSRCH) resource for communication with an evolved NodeB (eNodeB) regarding device-to-device (D2D) resource scheduling;

determining, by the first user equipment, data to be sent to a second user equipment;

determining, by the first user equipment, a D2D transmission resource indication to be sent to the eNodeB;

sending, by the first user equipment, on a resource corresponding to the resource configuration information, to the eNodeB, a resource scheduling request carrying the D2D transmission resource indication, wherein the D2D transmission resource indication is for requesting the eNodeB to allocate a D2D transmission resource;

receiving, by the first user equipment, D2D transmission resource information, wherein the D2D transmission resource is for sending the data to the second user equipment, and the D2D transmission resource information is allocated by the eNodeB according to the D2D transmission resource indication; and sending, by the first user equipment, to the second user equipment, the data to the second user equipment on the D2D transmission resource corresponding to the D2D transmission resource information.

2. The first user equipment according to claim 1, wherein determining the D2D transmission resource indication to be sent to the eNodeB is according to a correspondence between a size of a D2D data volume to be sent and the D2D transmission resource indication to be sent to the eNodeB.

3. The first user equipment according to claim 1, wherein determining the D2D transmission resource indication to be sent to the eNodeB is according to a correspondence between a message type of D2D transmission data to be sent and the D2D transmission resource indication to be sent to the eNodeB.

4. The first user equipment according to claim 1, wherein determining the D2D transmission resource indication to be sent to the eNodeB is based on a preconfigured correspondence between resource information for sending the data and the D2D transmission resource indication to be sent to the eNodeB.

5. The first user equipment according to claim 1, wherein determining the D2D transmission resource indication to be sent to the eNodeB is according to a correspondence between a logical channel of D2D data to be sent and the D2D transmission resource indication to be sent to the eNodeB.

6. The first user equipment according to claim 1, wherein determining the D2D transmission resource indication to be sent to the eNodeB is according to a correspondence between a logical channel group of D2D data to be sent and the D2D transmission resource indication to be sent to the eNodeB.

7. The first user equipment according to claim 1, wherein determining the D2D transmission resource indication to be sent to the eNodeB is based on whether or not a D2D service type corresponds to a security service or a non-security service.

8. An evolved NodeB (eNodeB), comprising a processor and a non-transitory computer-readable medium having processor-executable instructions stored thereon, wherein the processor-executable instructions, when executed by the processor, facilitate performance of the following:

allocating, by the eNodeB, resource configuration information of a device-to-device physical scheduling request channel (D2D PSRCH) resource for communication with a first user equipment regarding device-to-device (D2D) resource scheduling;

sending, by the eNodeB, to the first user equipment, the resource configuration information;

receiving, by the eNodeB, a resource scheduling request from the first user equipment on a resource corresponding to the resource configuration information, wherein the scheduling request carries a D2D transmission resource indication;

allocating, by the eNodeB, a D2D transmission resource to the first user equipment according to the D2D transmission resource indication, wherein the D2D transmission resource is to be used by the first user equipment to send data to a second user equipment; and sending, by the eNodeB, to the first user equipment, D2D transmission resource information regarding the allocated D2D transmission resource.

9. The eNodeB apparatus according to claim 8, wherein allocating the D2D transmission resource to the first user equipment is according to a correspondence between the D2D transmission resource indication and resource information that is for the first user equipment to send the data.

10. The eNodeB according to claim 9, wherein allocating the D2D transmission resource to the first user equipment further comprises:

allocating the D2D transmission resource to the first user equipment according to a correspondence between the D2D transmission resource indication and a size of a D2D data volume to be sent by the first user equipment; or allocating the D2D transmission resource to the first user equipment according to a correspondence between the D2D transmission resource indication and a message type of D2D transmission data to be sent by the first user equipment; or allocating the D2D transmission resource to the first user equipment according to a correspondence between the D2D transmission resource indication and a priority of a D2D data message to be sent by the first user equipment; or allocating the D2D transmission resource to the first user equipment according to a correspondence between the D2D transmission resource indication and a logical channel of D2D data to be sent by the first user equipment; or allocating the D2D transmission resource to the first user equipment according to a correspondence between the D2D transmission resource indication and a logical channel group of D2D data to be sent by the first user equipment.

11. The eNodeB according to claim 8, wherein the processor-executable instructions, when executed, further facilitate: preconfiguring a correspondence between data information and the D2D transmission resource indication for the first user equipment.

12. A user equipment, comprising a processor and a non-transitory computer-readable medium having processor-executable instructions stored thereon, wherein the processor-executable instructions, when executed by the processor, facilitate performance of the following:

obtaining, by the user equipment, a first data transmission resource and a second data transmission resource that are allocated by an evolved NodeB (eNodeB), wherein the first transmission resource is for communication with another user equipment, and the second transmission resource is for communication with the eNodeB;

determining, by the user equipment, to construct, when the first data transmission resource is capable of accommodating all device-to-device (D2D) data, a Media Access Control protocol data unit (MAC PDU) that does not comprise a D2D buffer status report (BSR); and sending, by the user equipment, on the second data transmission resource, the MAC PDU.

13. A resource requesting method, comprising:

receiving, by a first user equipment, resource configuration information of a device-to-device physical scheduling request channel (D2D PSRCH) resource for communication between the first user equipment and an evolved NodeB (eNodeB) regarding device-to-device (D2D) scheduling;

determining, by the first user equipment, data to be sent to a second user equipment;

determining, by the first user equipment, a D2D transmission resource indication to be sent to the eNodeB;

sending, by the first user equipment, on a resource corresponding to the resource configuration information, to the eNodeB, a resource scheduling request carrying the D2D transmission resource indication, wherein the D2D transmission resource indication is for requesting the eNodeB to allocate a D2D transmission resource to the first user equipment;

receiving, by the first user equipment, D2D transmission resource information for sending the data to the second user equipment, wherein the D2D transmission resource information is allocated by the eNodeB according to the D2D transmission resource indication; and sending, by the first user equipment, the data to the second user equipment on the D2D transmission resource.

14. The method according to claim 13, wherein determining the D2D transmission resource indication to be sent to the eNodeB is according to:

to a correspondence between a size of a D2D data volume to be sent and the D2D transmission resource indication to be sent to the eNodeB; or a correspondence between a message type of D2D transmission data to be sent and the D2D transmission resource indication to be sent to the eNodeB; or a correspondence between a priority of a D2D data message to be sent and the D2D transmission resource indication to be sent to the eNodeB; or a correspondence between a logical channel of D2D data to be sent and the D2D transmission resource indication to be sent to the eNodeB; or a correspondence between a logical channel group of D2D data to be sent and the D2D transmission resource indication to be sent to the eNodeB.

15. The method according to claim 13, wherein determining the D2D transmission resource indication to be sent to the eNodeB is based on a preconfigured correspondence between data information and the D2D transmission resource indication.

* * * * *